United States Patent
Ueno

(10) Patent No.: US 12,515,778 B2
(45) Date of Patent: Jan. 6, 2026

(54) SHIP CONTROL DEVICE, SHIP CONTROL METHOD, AND SHIP CONTROL PROGRAM

(71) Applicant: FURUNO ELECTRIC CO., LTD., Hyogo (JP)

(72) Inventor: Hideki Ueno, Takarazuka (JP)

(73) Assignee: FURUNO ELECTRIC COMPANY LIMITED, Hyogo (JP)

(*) Notice: Subject to any disclaimer, the term of this patent is extended or adjusted under 35 U.S.C. 154(b) by 309 days.

(21) Appl. No.: 18/333,469

(22) Filed: Jun. 12, 2023

(65) Prior Publication Data

US 2024/0010318 A1   Jan. 11, 2024

(30) Foreign Application Priority Data

Jul. 6, 2022   (JP) .................................. 2022-108762

(51) Int. Cl.
*B63H 25/02* (2006.01)
*B63H 25/42* (2006.01)

(52) U.S. Cl.
CPC ............ *B63H 25/02* (2013.01); *B63H 25/42* (2013.01); *B63H 2025/026* (2013.01)

(58) Field of Classification Search
CPC ... B63H 25/02; B63H 25/42; B63H 2025/026
USPC .......................................................... 701/21
See application file for complete search history.

(56) References Cited

U.S. PATENT DOCUMENTS

| 2005/0092225 A1 | 5/2005 | Kaji et al. | |
| 2005/0164569 A1 | 7/2005 | Kaji et al. | |
| 2011/0166724 A1* | 7/2011 | Hiramatsu | B63H 25/42 |
| | | | 702/85 |
| 2021/0078687 A1* | 3/2021 | Ueno | G05D 13/64 |

FOREIGN PATENT DOCUMENTS

| EP | 3 098 159 A1 | 11/2016 |
| JP | 2008-155764 A | 7/2008 |
| JP | 2011-140272 A | 7/2011 |
| WO | 2013/089244 A1 | 6/2013 |

OTHER PUBLICATIONS

The extended European search report issued by the European Patent Office on Dec. 20, 2023, which corresponds to European Patent Application No. 23183534.9-1009 and is related to U.S. Appl. No. 18/333,469.

* cited by examiner

*Primary Examiner* — Helal A Algahaim
*Assistant Examiner* — Michael T Dowling
(74) *Attorney, Agent, or Firm* — Studebaker Brackett PLLC

(57) ABSTRACT

To more reliably achieve the turn intended by the operator without making major system changes. The ship control device is provided with an input unit for inputting a maneuvering command value related to the operation control of the ship and a control unit for generating and outputting a steering angle command signal and a throttle command signal to the ship based on the maneuvering command value. If the maneuvering command value is in the intermittent control range, the control unit outputs a throttle command signal with an intermittent control waveform having a Hi level and a Low level.

19 Claims, 20 Drawing Sheets

| x | Shift | Throttle opening [%] |
|---|---|---|
| +100≧x≧+10 | F | Fmax~Fmin |
| +10>x>-10 | N | 0 |
| -10≧x≧-100 | R | Rmin~Rmax |

| y | Command rudder angle |
|---|---|
| +100 ≧ y ≧ +1 | SH (max. right turning angle) to 0° |
| +10>y>-10 | 0 ° (dead zone) |
| -10≧y≧-100 | 0° to PH (max. left turning angle) |

| z | Mode |
|---|---|
| ABS(z) < 30 | Intermittent Control Disabled |
| 30 < ABS (z) < 70 | Current mode |
| ABS(z)>70 | Intermittent Control Enabled |

SHIP CONTROL DEVICE, SHIP CONTROL METHOD, AND SHIP CONTROL PROGRAM

CROSS-REFERENCE TO RELATED APPLICATION(S)

The application claims priority under 35 U.S.C. § 119 to Japanese Patent Application No. 2022-108762, which was filed on Jul. 6, 2022, the entire disclosure of which is hereby incorporated by reference.

TECHNICAL FIELD

Background

The present invention relates to technology for controlling the operation of a ship.

At present, various technologies for controlling the operation of ships are being devised.

In addition, a hydraulically driven steering machine has conventionally been adopted in ships in general use.

However, if an electronic control system is adopted, the ship control system must be drastically replaced or a large-scale system must be newly adopted.

In addition, in a configuration in which no side thrusters or other auxiliary thrust generating means are provided, and only the main engine (Outboard, inboard, and inboard and outboard motors (z-drive), etc.) is provided, it is not possible to generate thrust in the right lateral direction of the hull, and it is also not possible to generate thrust to perform a turn in place by simply switching the forward and backward thrust. In other words, the maneuvering of the ship in the low speed region becomes limited and difficult. Furthermore, when a conventional hydraulically driven coxswain is used, the response speed of the movement of the coxswain to the operating input is slower than that of the electronically controlled coxswain, resulting in a larger turn (turning head) than the operator intends.

Therefore, it is an object of the present invention to provide a ship control system that enables easy maneuvering of a ship in a low-speed region without making a major system change.

SUMMARY

The ship control device is provided with a user input interface for inputting a ship handling command value corresponding to at least commands for throttle control and intermittent control, and a control unit (processing circuitry) for generating a throttle command signal to the ship based on the ship handling command value, with regard to the operation control of the ship.

The control unit is provided with a mode setting unit for setting an activation of the intermittent control if the value corresponding to the command for the intermittent control is within a prescribed range for the intermittent control, and a throttle command signal generation unit for generating the throttle command signal of an intermittent control waveform having a Hi level and a Low level when the intermittent control is activated.

In this configuration, thrust is generated intermittently, so that, for example, when it is executed at a start of turning, the turning radius is suppressed from becoming undesirably large even if the actual rudder angle is delayed to follow the command rudder angle. In addition, when it is executed during turning, for example, the straight-ahead inertia in the arc direction (the circumferential direction of turning) is suppressed to improve the turning. This enables the turning intended by the operator to be realized more reliably.

Also, in the ship control device of the present invention, the control unit is provided with a mode setting unit for setting the value corresponding to the throttle control within the prescribed minimum turning control range and enabling of the intermittent control, a rudder angle command signal generation unit for setting the rudder angle command signal for instructing the rudder angle of the ship to the maximum command rudder angle within the settable range when the intermittent control is enabled, and a throttle command signal generation unit for generating the throttle command signal of the intermittent control waveform having the prescribed Hi level for the minimum turning control and the prescribed Low level for the minimum turning control when the intermittent control is enabled.

In this configuration, intermittent thrust is generated after the actual rudder angle becomes the desired rudder angle. Therefore, the turning radius can be reduced when the ship tries to turn from a state where it is not moving forward or backward.

In the ship control device of the present invention, the throttle command signal generating unit suppresses the actual rudder angle to less than the value of the throttle command signal 0 or the throttle command signal below a predetermined threshold value during the period until the actual rudder angle reaches the maximum rudder angle in the case of the minimum turning control. In this configuration, unwanted forward or backward movement at the start of the minimum turning control can be suppressed.

Also, in the ship control device of the present invention, the throttle command signal generation unit generates a throttle command signal having arising waveform with a gentle slope in the first rising waveform compared to the falling waveform when the actual rudder angle reaches the maximum command rudder angle. In this configuration, unwanted forward or backward movement at the initial stage of thrust generation can be suppressed.

Also, in the ship control device of the present invention, a throttle command signal generation unit generates a throttle command signal with a rising waveform of a gentle gradient compared to a falling waveform. In this configuration, a sudden increase in thrust can be suppressed, and an impact (mechanical impact) at shift switching and an unwanted ship speed fluctuation can be suppressed.

In the ship control device of the present invention, the throttle command signal generation unit sets the Hi level by the throttle opening based on the maneuvering command value corresponding to the throttle control, and the Low level by the dead-throw opening.

In this configuration, an example of intermittent control is shown. By setting the Low level to the dead-slow opening, the minimum thrust can be maintained even at the Low level and stable turning (turning head) can be achieved.

In the ship control device of the present invention, a throttle command signal generation unit sets the Hi level for a predetermined minimum turning control by the throttle opening for minimum turning control and the Low level for minimum turning control by the throttle fully closed state.

In this configuration, the Low level becomes the throttle fully closed state during minimum turning control, so that the turning radius can be further reduced.

In the ship control device of this invention, a throttle command signal generating unit adjusts the throttle opening for minimum turning control according to the maneuvering command value corresponding to the throttle control during minimum turning control. In this configuration, the behavior of the ship in minimum turning control can be adjusted.

In the ship control device of the present invention, the user input interface further inputs a thrust holding signal that instructs the holding of the ship's thrust by the user's operation. Upon receiving the input of the thrust holding signal, the throttle command signal generation unit fixes the level of the throttle command signal so as to hold the throttle opening according to the maneuvering command value at the time of the input of the thrust holding. In this configuration, the desired thrust can be maintained even if the maneuvering command value fluctuates undesirably.

In the ship control device of the present invention, upon receiving an instruction to adjust the maximum throttle opening, the throttle command signal generation unit sets the maximum throttle opening corresponding to the Hi level of the throttle command signal in accordance with the adjustment instruction. In this configuration, the maximum throttle opening can be adjusted as desired by the operator.

Also, in the hull control device of the present invention, the throttle command signal generation unit does not perform intermittent control if the ship's traveling direction is backward, and generates a throttle control command value larger than the currently set maximum thrust value if the value corresponding to the intermittent control command among the maneuvering command values is within the prescribed intermittent control range. In this configuration, it is easy to achieve the desired turning during backward turning.

The ship control system of the present invention also includes the ship control device described above and an operator for generating a maneuvering command value. The operator is provided with a shaft with one end fixed and the other end movable, a head positioned at the other end of the shaft and capable of rotating around the shaft axis, and a maneuvering command value generation unit for generating a maneuvering command value according to the position of the head and the amount of rotation of the head.

In this configuration, the maneuvering command value can be determined by an operator such as a so-called joystick. Thus, the operator can realize intermittent control during turning, minimal turning control and the like mentioned above by simple and easy to understand operation input.

Also, in the ship control system of the present invention, a joystick is used as the operator. The maneuvering command value generation unit generates the maneuvering command value as an x-axis direction position parallel to the ship's fore and aft direction, a y-axis direction position parallel to the ship's starboard port direction, and a z-axis direction position according to the amount of rotation. The control unit determines the level of the throttle command signal based on the x-axis direction position in the maneuvering command value, determines the command rudder angle based on the y-axis direction position in the maneuvering command value, and performs intermittent control based on the z-axis direction position in the maneuvering command value.

In this configuration, the operator can perform desired forward, desired backward, desired turn (turning head) and intermittent control with simple operations using a joystick.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 1 is a functional block diagram showing an example of the configuration of a ship control system including a ship control device according to the first embodiment of the present invention;

FIG. 2A is an external perspective view of a joystick, FIG. 2B is a plan view of the joystick, and FIGS. 2C and 2D are side views showing an example of the behavior of the joystick;

FIG. 3 is a functional block diagram showing an example of the configuration of a control unit according to the first embodiment of the present invention;

FIG. 4A is a diagram showing the concept of setting for each command value, and FIG. 4B is a table showing the concept of setting for each command value;

FIG. 5 is a flow chart showing an example of processing when switching to the intermittent control mode;

FIG. 6 shows an example of the waveform of the indirectly controlled throttle command signal;

FIG. 7A shows the position of the head of the first controller, FIG. 7B shows an example of the behavior of a ship when intermittent control is performed, FIG. 7C shows an example of the behavior of a ship when intermittent control is not performed, and FIG. 7D shows a comparison of the behavior of a ship when intermittent control is performed, intermittent control is not performed, and the throttle opening is kept at a constant low level;

FIG. 8 shows the concept of the ship's behavior during turning with intermittent control;

FIG. 9 is a flow chart showing an example of the release (disable) process of the intermittent control mode;

FIG. 10 shows various examples of the traveling and turning directions;

FIG. 11 is a flow chart showing an example of boost control in the ship control technology according to the second embodiment;

FIG. 12 is a diagram showing an example of throttle opening during boost control;

FIG. 13 is a functional block diagram showing an example of the configuration of a control unit according to the third embodiment of the present invention;

FIG. 14 is a flow chart showing an example of the control of the minimum turning control mode;

FIGS. 15A and 15B show an example of the waveforms of the command rudder angle and throttle opening in the minimum turning control mode;

FIG. 16 is a flow chart showing an example of the throttle opening adjustment control in the minimum turning control according to the fourth embodiment;

FIG. 17A is a diagram showing the state of the head in the throttle opening adjustment control, and FIG. 17B is a diagram showing an example of the throttle opening setting in the throttle opening adjustment control;

FIG. 18 is a functional block diagram showing an example of the configuration of a ship control system including a ship control device according to the fifth embodiment of the present invention;

FIG. 19 is a flow chart showing an example of the thrust holding control; FIG. 20 is a flow chart showing an example of the adjustment control of the maximum thrust.

DETAILED DESCRIPTION

First Embodiment

Figure 1:
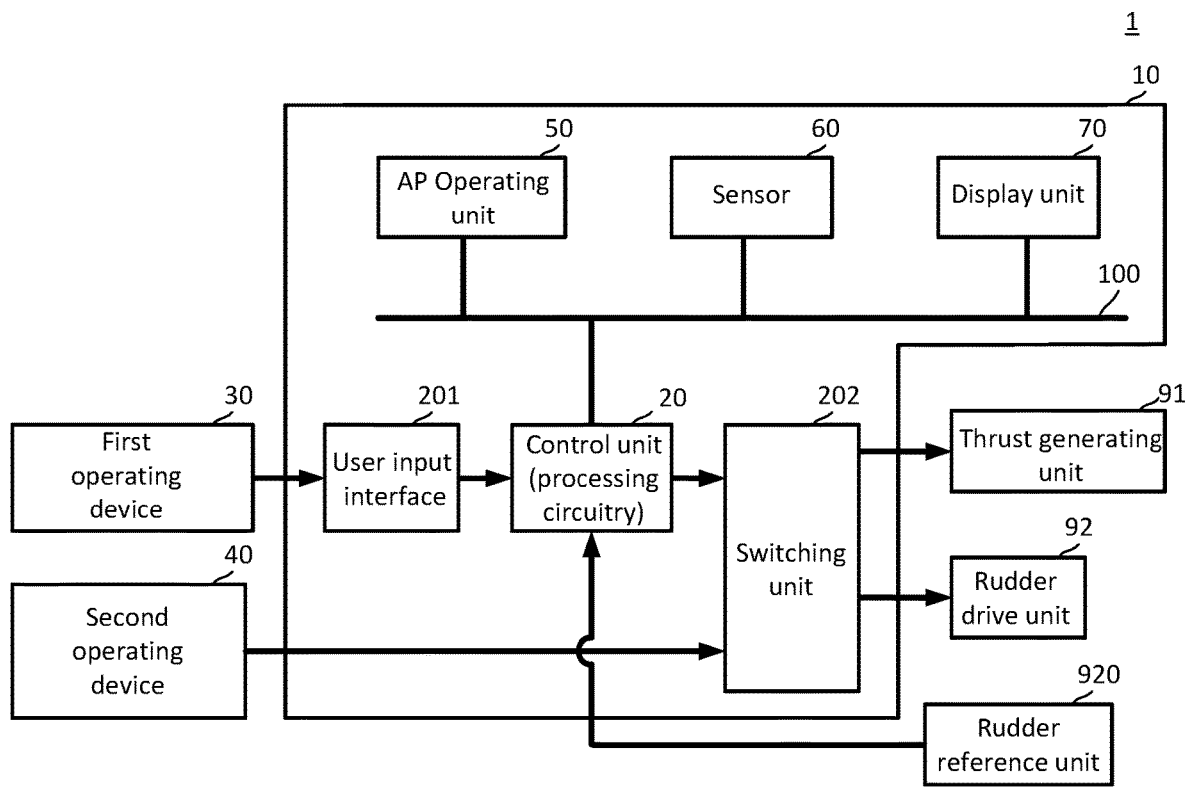
FIG. 1.

Ship control technology (Ship control device, ship control method, and ship control program) according to the first embodiment of the present invention will be described with reference to the figures. FIG. 1 is a functional block diagram showing an example of the configuration of a ship control system including a ship control device according to the first embodiment of the present invention.

(Configuration of a Ship Control System 1 and a Ship Control Device 10)

As shown in FIG. 1, the ship control system 1 includes a ship control device 10, a first operating device 30, a second operating device 40, a thrust generating unit 91, a rudder drive unit 92, and a rudder reference unit 920. The ship control device 10 includes a control unit 20, an AP operating unit 50, a sensor 60, a display unit 70, an input unit 201 (i.e., a user input interface), and a switching unit 202. The ship control system 1 is installed on the ship 90 of a ship performing autopilot control (automatic navigation control), for example.

The control unit 20, the AP operating unit 50, the sensor 60 and the display unit 70 are connected to each other by, for example, a data communication network 100 for the ship. The control unit 20 is also connected to the input unit 201 and the switching unit 202.

The first operating device 30 is connected to the input unit 201. The first operating device 30 is a so-called joystick. The first operating device 30 corresponds to the "operator" of the present invention. The input unit 201 is an input interface for electrical signals.

The second operating device 40 is connected to the switching unit 202. The second operating device 40 is, for example, a throttle lever and a steering wheel. The first operating device 30 and the second operating device 40 are installed, for example, in the wheelhouse of the ship 90.

The thrust generating unit 91, the rudder drive unit 92 and the rudder reference unit 920 are connected to the control unit 20. The control unit 20 and the thrust generating unit 91 are connected through, for example, a propulsion communication network (CAN, etc.). The control unit 20 and the rudder drive unit 92 and the rudder reference unit 920 are connected through, for example, an analog or digital communication line.

The thrust generating unit 91 and the rudder drive unit 92 are provided for, for example, outboard motors, inboard motors, outboard motors and various other types of propellers. The rudder drive unit 92, for example, rotates the rudder by a hydraulic drive system to adjust the rudder angle.

The thrust generating unit 91 and the rudder drive unit 92 are provided, for example, one each on the ship. That is, the ship 90 equipped with the ship control device 10 of this embodiment is a so-called ship with one axle and one rudder. It should be noted that a ship with one axle and one rudder means a ship equipped with a single command system, even if it is a multi-engine ship, and the operation of the rudder angle and the operation of the shift throttle are synchronized.

(Concept of Determining the Structure of the First Operating Device 30 and the Maneuvering Command Value)

Figure 2A:
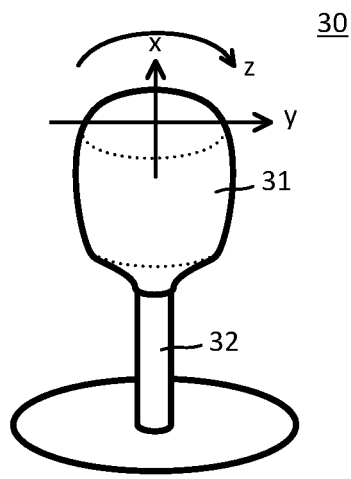
FIGS. 2A to 2D.
Figure 2B:
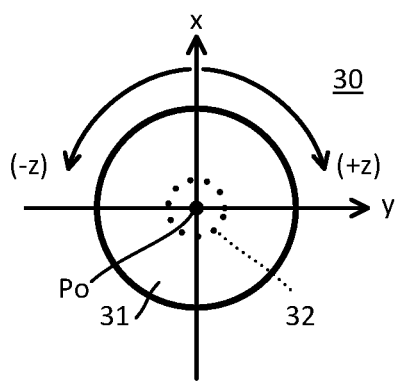
Figure 2C:
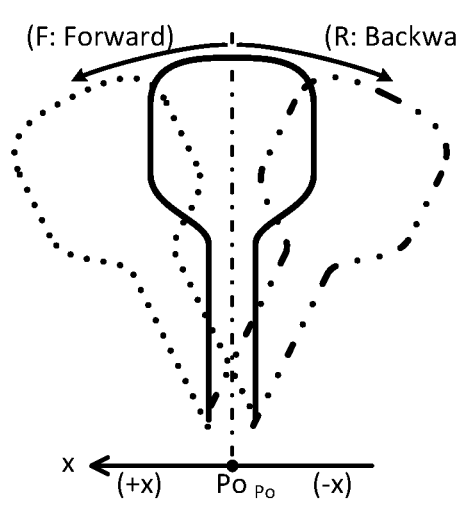
Figure 2D:
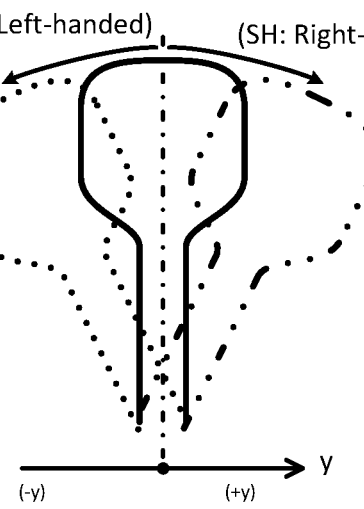

FIG. 2A is an external perspective view of the joystick, FIG. 2B is a plan view of the joystick, and FIG. 2C and FIG. 2D are side views showing an example of the behavior of the joystick.

As shown in FIG. 2A and FIG. 2B, the first operating device 30 has a control head 31 and a shaft 32. One end of the shaft 32 is fixed to the base (For example, the deck of the wheelhouse of a ship 90) so that its planar position does not change. A control head 31 is attached to the other end of the shaft 32.

The position of the other end of the shaft 32, i.e., the control head 31, varies with respect to one end of the shaft 32 by the operator's operation on the control head 31. Specifically, with the position of one end of the shaft 32 in the default state (when the operator does not operate the control head 31) as the reference point Po, the position of the control head 31 in the two-dimensional plane perpendicular to the axis of the shaft 32 varies by the operator's operation. For example, the position of the control head 31 varies when the operator pushes or pulls the control head 31 to tilt the shaft 32. Furthermore, the control head 31 is a rotatable structure around the axis of the shaft 32.

The first operating device 30 is equipped with a maneuvering command value generating unit (not shown). The maneuvering command value generating unit is a sensor that detects, for example, the position of the control head 31 on a two-dimensional plane and the amount of rotation of the control head 31. The maneuvering command value generating unit generates a maneuvering command value to be output to the control unit 20 according to the position of the head 31 and the amount of rotation of the control head 31.

Specifically, the maneuvering command value generating unit detects the position of the control head 31 in the direction parallel to the ship's fore and aft direction as the position in the x-axis direction and generates a joystick command value (x) based on this position. In this case, for example, the maneuvering command value generating unit sets the forward direction as the +x direction and the backward direction as the −x direction as shown in FIG. 2C.

The maneuvering command value generating unit detects the position of the control head 31 in the direction perpendicular to the ship's stern direction (right port direction) as the position in the y-axis direction and generates a joystick command value (y) based on this position. In this case, for example, as shown in FIG. 2D, the maneuvering command value generating unit sets the starboard direction (right turn direction) as the +y direction and the port direction (left turn direction) as the −y direction.

The maneuvering command value generation unit detects the rotation angle of the control head 31 and generates a joystick command value (z) based on this rotation angle. As a first aspect, the maneuvering command value generation unit generates a joystick command value (z) from the absolute value of the rotation angle regardless of the rotation direction. As a second aspect, the maneuvering command value generation unit detects the rotation direction of the control head 31 and generates a joystick command value (z) by, for example, setting clockwise (clockwise) as the +z direction and counterclockwise (counterclockwise) as the −z direction.

Thus, more specifically, the maneuvering command value generation unit generates the joystick command value (x), joystick command value (y), and joystick command value (z) as the maneuvering command value.

(Concrete Control Method of Turning Using Intermittent Control)

Figure 3:
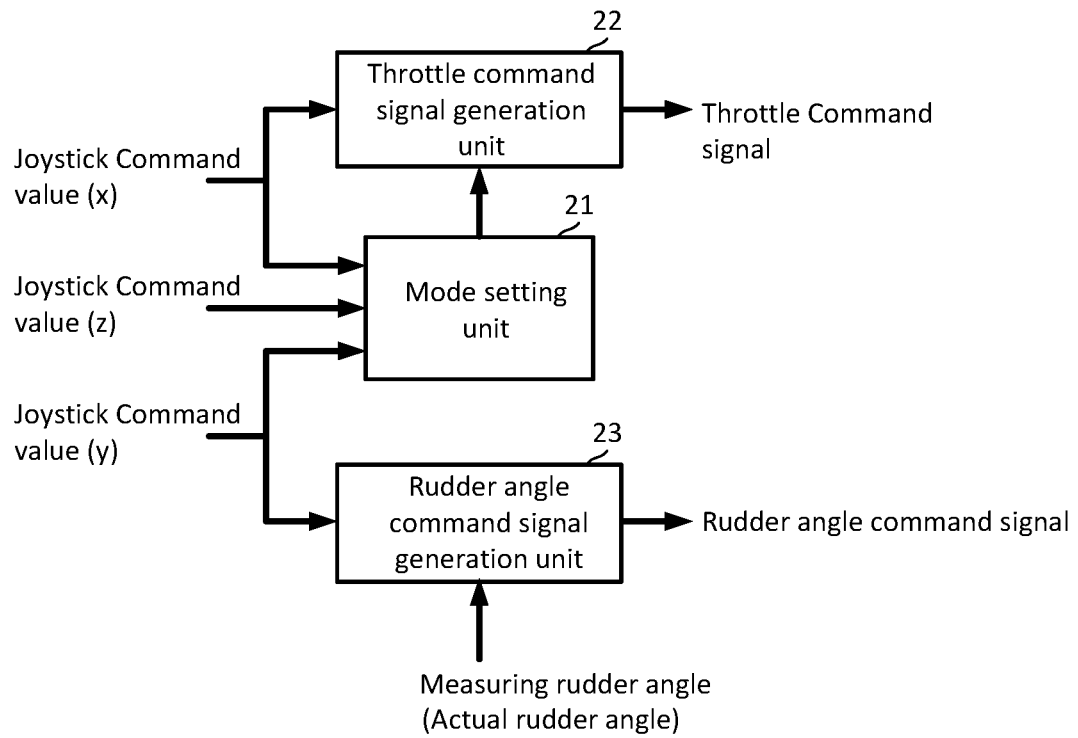
FIG. 3.

FIG. 3 is a functional block diagram showing an example of the configuration of a control unit according to the first embodiment of the present invention. As shown in FIG. 3, the control unit 20 includes a mode setting unit 21, a throttle command signal generation unit 22, and a rudder angle command signal generation unit 23. The control unit 20 is composed of, for example, an arithmetic processing unit such as a CPU, a program executed by the arithmetic processing unit, and a storage medium for storing the program.

When the ship is controlled by the first operating device 30, a maneuvering command value (Joystick command value (x), Joystick command value (y), Joystick command value (z)) is input to the mode setting unit 21. A joystick command value (x) in the maneuvering command value is input to the throttle command signal generation unit 22. A joystick command value (y) in the maneuvering command value is input to the rudder angle command signal generation unit 23.

(Relationship between joystick command value and setting of throttle opening, command rudder angle and intermittent control mode)

Figures 4A, 4B:
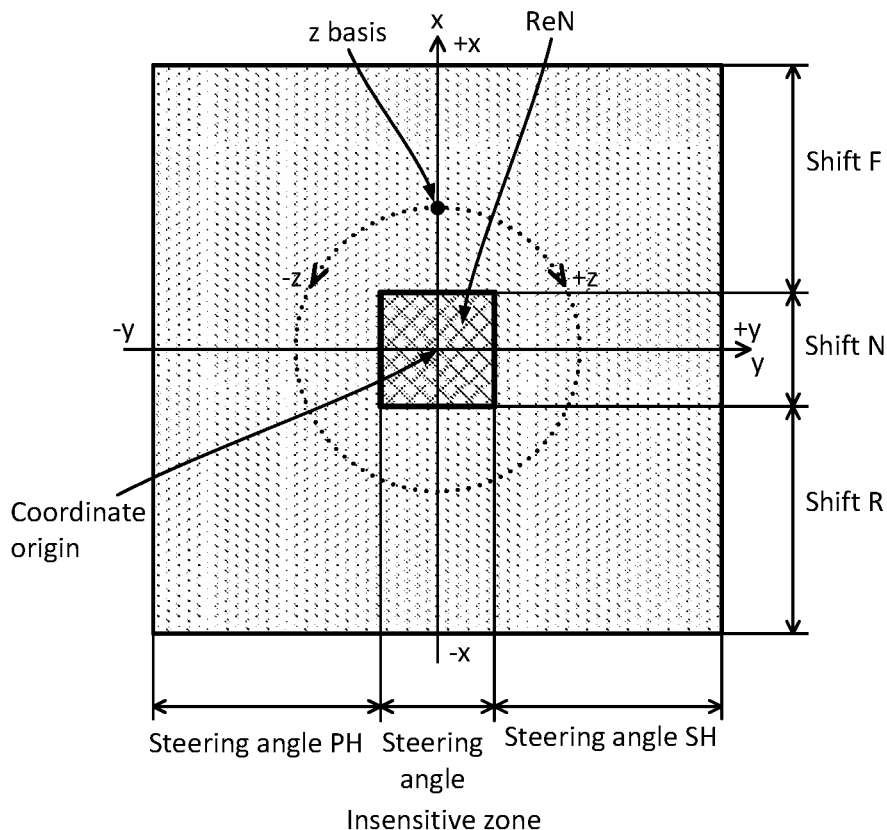
FIGS. 4A to 4B.

FIG. 4A is a diagram showing the concept of setting for each command value, and FIG. 4B is a table showing the concept of setting for each command value.

As shown in FIG. 4A and FIG. 4B, the joystick command value (x) is set to x=0 (coordinate origin) when the control head 31 is in the default state. The joystick command value (x) is set to a maximum value of +100 when it is farthest from the default position in the forward direction, and to increase as the position of the control head 31 is further from the default position in the two-dimensional plane. The joystick command value (x) has a minimum value of −100 when it is farthest from the default position in the backward direction, and is set so that the further the position of the control head 31 is from the default position in the two-dimensional plane, the smaller the value.

The joystick command value (y) has a maximum value of +100 when the control head 31 is farthest from the default position in the starboard forward direction, and is set so that the further the position of the control head 31 is from the default position in the two-dimensional plane, the larger the value. The joystick command value (y) has a minimum value of −100 when the head is farthest from the default position in the port forward direction, and is set so that the further the position of the control head 31 is from the default position in the two-dimensional plane, the smaller the value.

The default joystick command value (z) is when the control head 31 is not rotated, and z=0. The joystick command value (z) is set so that the value increases according to the amount of rotation of the control head 31 clockwise (rotation angle) and decreases according to the amount of rotation of the control head 31 counterclockwise (rotation angle). More specifically, the maximum value is +100 when the head is rotated clockwise to the maximum and the minimum value is −100 when the head is rotated counterclockwise to the maximum. When the absolute value of the amount of rotation is used, the joystick command value (z) is set such that the value increases as the absolute value of the amount of rotation (angle of rotation) increases. When the absolute value of the amount of rotation is not used (considering the direction of rotation), the joystick command value (z) is set according to the amount of rotation and the direction of rotation. Specifically, the joystick command value (z) is set such that the value increases as the amount of clockwise rotation increases, and decreases as the amount of counterclockwise rotation increases.

As shown in FIG. 4A and FIG. 4B, the shift setting and throttle opening are set by the joystick command value (x). For example, the range of +100> or =x> or =+10 is set to shift F and the throttle opening is set between $F_{max}$ and $F_{min}$. That is, if the joystick command value (x) is +100, the throttle opening is set to $F_{max}$, and if the joystick command value (x) is +10, the throttle opening is set to $F_{min}$. Furthermore, if the joystick command value (x) is between +100 and +10, the throttle opening corresponding to the joystick command value (x) is set to a value between $F_{max}$ and $F_{min}$. In this case, the change in the joystick command value (x) and the change in the throttle opening have a monotonic decreasing relationship, for example. In this case, filter processing may be performed to suppress the sudden change in the throttle opening. Thus, for example, the mechanical shock generated when the throttle opening is changed can be suppressed.

Similarly, for example, the range −10>=x>=−100 is set to shift R and the throttle opening is set between $R_{min}$ and $R_{max}$. That is, if the joystick command value (x) is −10, the throttle opening is set to $R_{min}$, and if the joystick command value (x) is −100, the throttle opening is set to $R_{max}$. Furthermore, if the joystick command value (x) is between −10 and −100, the throttle opening corresponding to the joystick command value (x) is set to a value between $R_{min}$ and $R_{max}$. In this case, the change in the joystick command value (x) and the change in the throttle opening have a monotonic increasing relationship, for example.

Note that the throttle opening Fmax and $R_{max}$ need not be limited to the throttle opening of 100% and are set appropriately. Similarly, the throttle opening $F_{min}$ and $R_{min}$ are set appropriately (For example, 20(%)) and not the throttle opening of 0%.

Then the range +10>x>−10 is set to shift N and the throttle opening is set to 0%.

The relationship between the joystick command value (x) and the throttle opening may be stored in a throttle command signal generation unit 22 or the like, and these relationships are stored, and the throttle opening may be calculated from the joystick command value (x) by this relationship. When this relationship is used, the filter processing described above may be performed.

As shown in FIG. 4A and FIG. 4B, the command rudder angle is set by the joystick command value (y). For example, the range of +100> or =y> or =+10 is set to turn right and the command rudder angle is set between SH (maximum rudder angle) [deg] and 0 [deg]. That is, if the joystick command value (y) is +100, the command rudder angle is set to SH [deg], and if the joystick command value (y) is +10, the command rudder angle is set to 0 [deg]. Furthermore, if the joystick command value (y) is between +100 and +10, the command rudder angle corresponding to the joystick command value (y) is set to a value between SH [deg] and 0 [deg]. In this case, the change in the joystick command value (y) and the command rudder angle are in monotonic decrease, for example. In this case, a filter processing may be performed to suppress the sudden change in the command rudder angle. Thus, for example, mechanical shock caused by the change in the rudder angle can be suppressed.

Similarly, for example, a range of −10> or =y> or =−100 is set to turn left, and the command rudder angle is set between 0 [degrees] and PH (maximum left rudder angle) [degrees]. That is, if the joystick command value (y) is −10, the command rudder angle is set to 0 [degrees], and if the joystick command value (y) is −100, the command rudder angle is set to PH [degrees]. Furthermore, if the joystick command value (y) is between −10 and −100, the command rudder angle corresponding to the joystick command value (y) is set to a value between 0 [degrees] and PH [degrees]. In this case, the change in the joystick command value (y) and the change in the command rudder angle have a monotonic increasing relationship, for example.

Then, the range of +10>y>−10 is set to the dead zone of rudder angle control, and the command rudder angle is set to 0 [degrees].

The relationship between the joystick command value (y) and the command rudder angle may be stored in the rudder angle command signal generation unit 23, and these relationships are stored, and the command rudder angle may be calculated from the joystick command value (y) by this relationship. When this relationship is used, the filter processing described above may be performed.

As shown in FIG. 4A and FIG. 4B, the enable/disable (i.e., activation/deactivation) of intermittent control is set by the joystick command value (z). For example, if the absolute value ABS (z) of the joystick command value (z) is ABS (z)<30, disable intermittent control mode is set. If 30<ABS (z)<70, maintenance of the current mode (no mode change) is set. ABS (z)>70, the enable of intermittent control mode is set.

The relationship between the joystick command value (z) and the intermittent control mode is stored in the mode setting unit 21. The relationship between the joystick command value (x) and the shift N, and the relationship between the joystick command value (y) and the dead zone of the steering angle control are also stored in the mode setting unit 21.

(Switching to Intermittent Control Mode)

Figure 5:
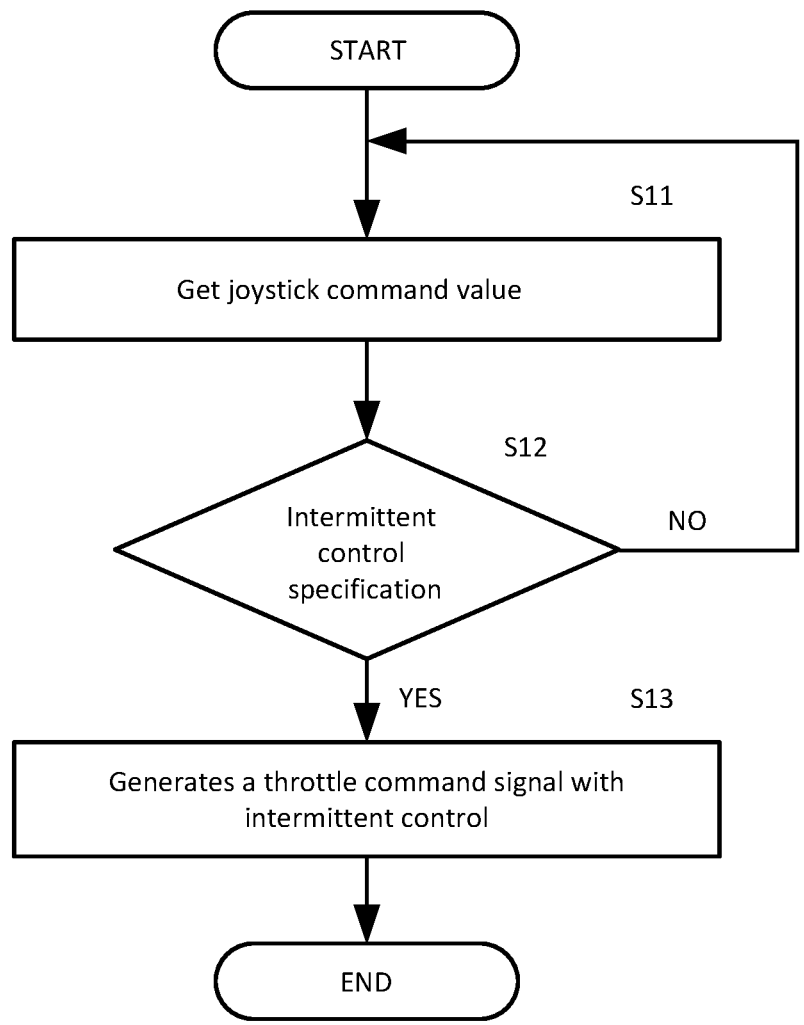
FIG. 5.

FIG. 5 is a flow chart showing an example of the processing when switching to intermittent control mode.

A mode setting unit 21 acquires a maneuvering command value (Joystick command value (x), Joystick command value (y), Joystick command value (z)) (S 11).

When the mode setting unit 21 detects from the joystick command value (x) and the joystick command value (y) that the throttle opening is not shift N and not a dead zone of steering angle control, and detects from the joystick command value (z) that the intermittent control mode is enabled (the joystick command value (z) is within the range for intermittent control) (S 12: YES), it instructs the throttle command signal generation unit 22 to enable intermittent control.

Upon receiving the instruction to enable intermittent control, the throttle command signal generation unit 22 generates a throttle command signal with intermittent control (S 13).

Figure 6:
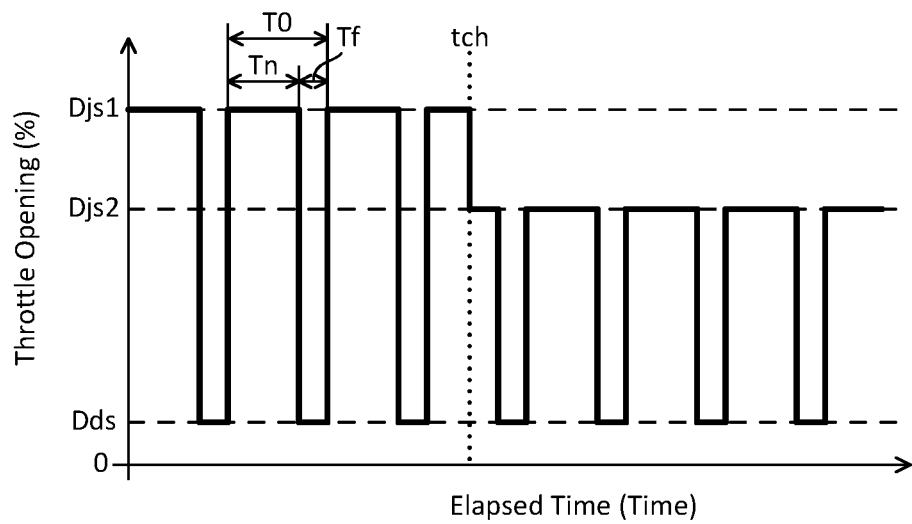
FIG. 6.

FIG. 6 shows an example of the waveform of the throttle command signal with indirect control. As shown in FIG. 6, the amplitude of the intermittently controlled throttle command signal (corresponding to the throttle opening) alternates between the Hi level and the Low level. More specifically, in the repetition period TO, the device has an ON period Tn with an amplitude of the Hi level and an OFF period Tf with an amplitude of the Low level at a predetermined ratio. Amplitudes Djs1 and Djs2 of the Hi level are set by a joystick command value (x). The amplitude Dds of the Low level is set by the dead-slow opening.

As shown in FIG. 6, when the joystick command value (x) changes with the elapsed time tch, the amplitude Djs1 of the Hi level changes to the amplitude Djs2 of the Hi level according to the change in the joystick command value (x). In this case, the ratio between the ON period Tn and the OFF period Tf may be maintained or changed.

A throttle command signal generation unit 22 outputs a throttle command signal of intermittent control to a thrust generating unit 91. A thrust generating unit 91 generates thrust intermittently based on a throttle command signal of intermittent control.

Figure 7A:
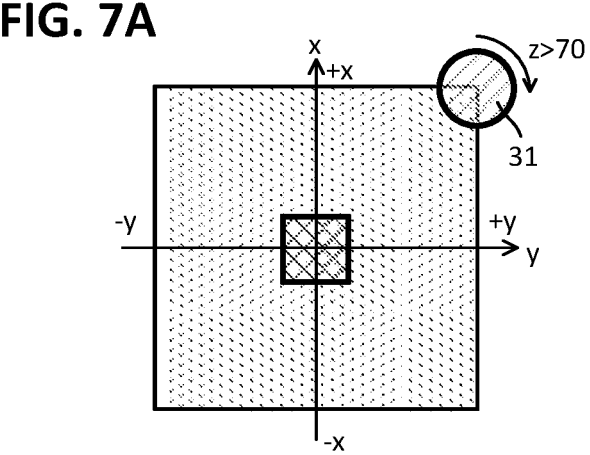
FIGS. 7A to 7D.
Figure 7B:
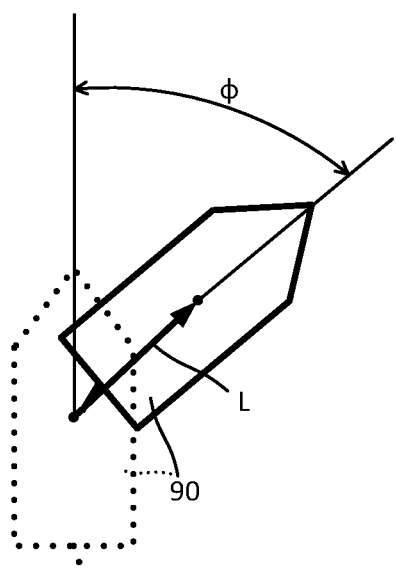
Figure 7C:
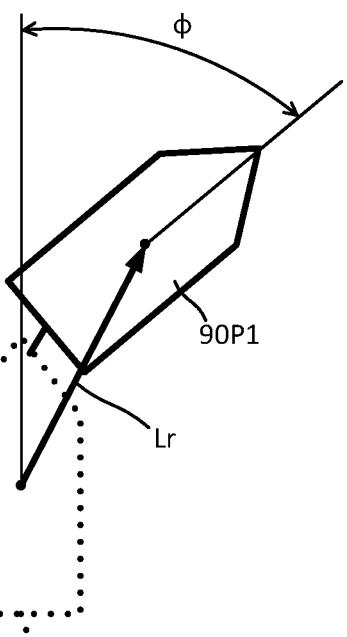
Figure 7D:
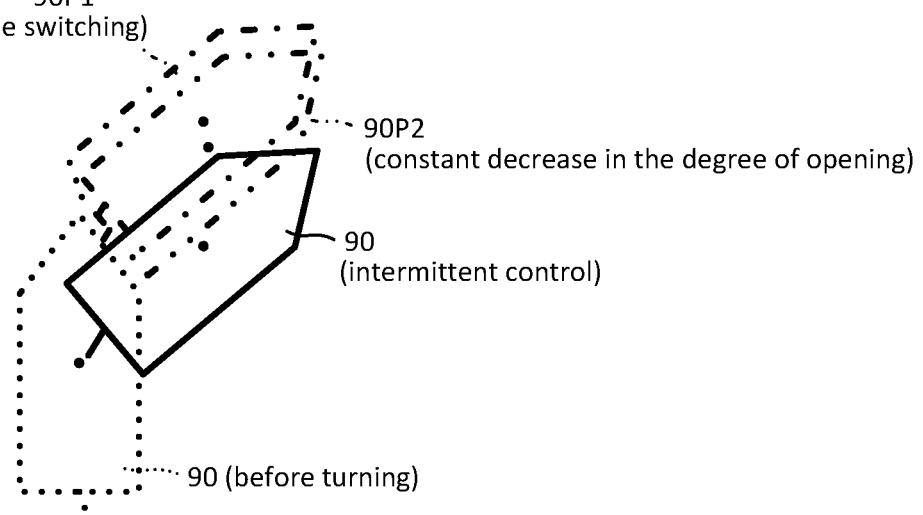

Such control enables the ship 90 to turn as follows. FIG. 7A is a diagram showing the position of the head of the first operating device, FIG. 7B is a diagram showing an example of the ship's behavior when intermittent control is performed, FIG. 7C is a diagram showing an example of the ship's behavior when intermittent control is not performed, and FIG. 7D is a diagram comparing the ship's behavior when intermittent control is performed, intermittent control is not performed, and the throttle opening is kept at a constant low level.

As shown in FIG. 7A, when the control head 31 is operated to +x>+10, +y>+10, and z>+70, the mode setting unit 21 instructs the activation of intermittent control. The throttle command signal generation unit 22 sets the Hi level of the throttle command signal with the value of the joystick command value (x). The rudder angle command signal generation unit 23 sets the command rudder angle with the value of the joystick command value (y) and generates a rudder angle command signal according to the difference between the actual rudder angle and the command rudder angle.

When intermittent control is performed, the time for generating propulsive force per unit time is shorter than when intermittent control is not performed, and the propulsive force decreases. On the other hand, the command rudder angle does not change with or without intermittent control. Therefore, as shown in FIG. 7B and FIG. 7C, when the ship is turned at the turning angle phi, the travel distance L of the ship 90 with intermittent control is shorter than the travel distance Lr of the ship 90 P1 without intermittent control. That is, the ship 90 with intermittent control can realize turning (turning) at a radius smaller than that of the ship 90 P1 without intermittent control.

This is because, for example, if intermittent control is not performed, the rudder angle reaches the command rudder angle later than the generation of the propulsive force in hydraulically driven rudder angle control. In other words, the ship is more advanced by the time it makes the desired turn. However, this is because the advance of the ship is restrained by deliberately reducing the propulsion force through intermittent control of the propulsion force.

This suppresses, for example, turning (turning) with a radius larger than desired by the operator. Therefore, turning (turning) desired by the operator can be realized more reliably.

It is also possible to reduce the turning radius by lowering the throttle opening constant without performing intermittent control, but as shown in FIG. 7D, the turning radius can be reduced by performing intermittent control.

Figure 8:
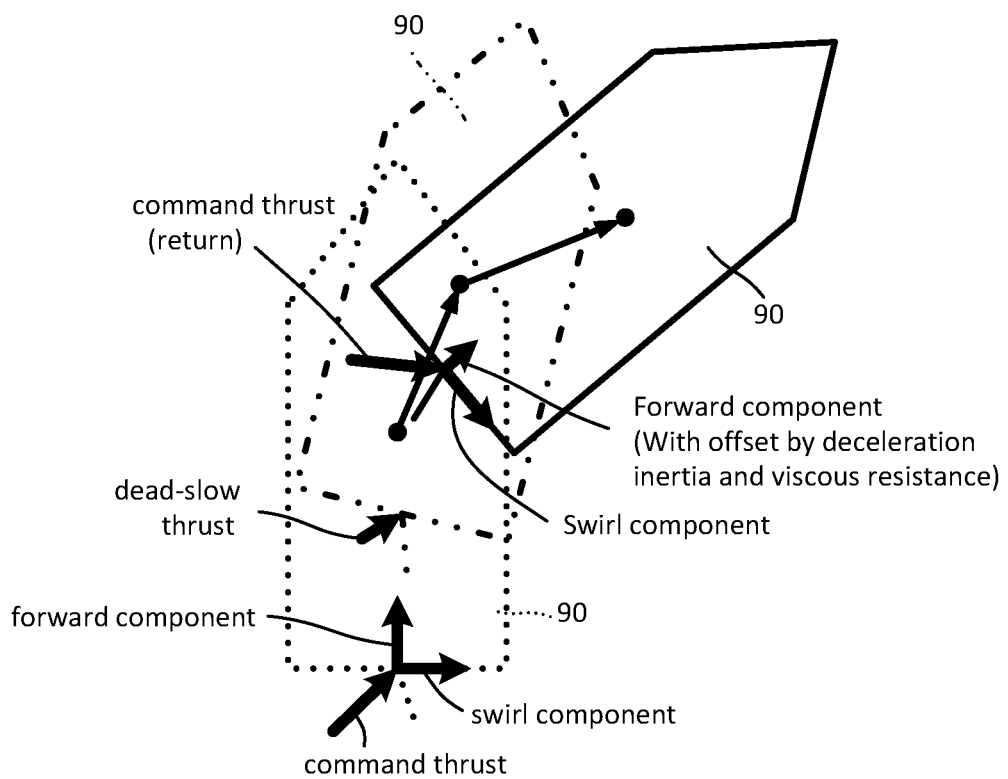
FIG. 8.

FIG. 8 is a diagram showing the concept of the ship's behavior during turning with intermittent control. As shown in FIG. 8, when the throttle command signal is at Hi level during forward turning (turning) of the ship, the command thrust corresponding to Hi level acts on the ship 90 and generates forward and turning components according to the command rudder angle.

Then, when the throttle command signal is at Low level, the thrust corresponding to the dead-throw opening degree acts on the ship 90. That is, the thrust pertaining to the ship 90 becomes small.

Then, when the throttle command signal reaches the Hi level, the command thrust corresponding to the Hi level acts again on the ship 90. When the thrust is reduced and then restored in this way, unit of the forward component is offset by the deceleration inertia and viscous resistance of the water and becomes smaller. As a result, the swirl component increases relatively and the swirl angle becomes larger.

In this way, by performing intermittent control, the swirl (turning head) can be realized with a smaller radius than the constant decrease in thrust.

(Release (Disable) Processing of Intermittent Control Mode)

Figure 9:
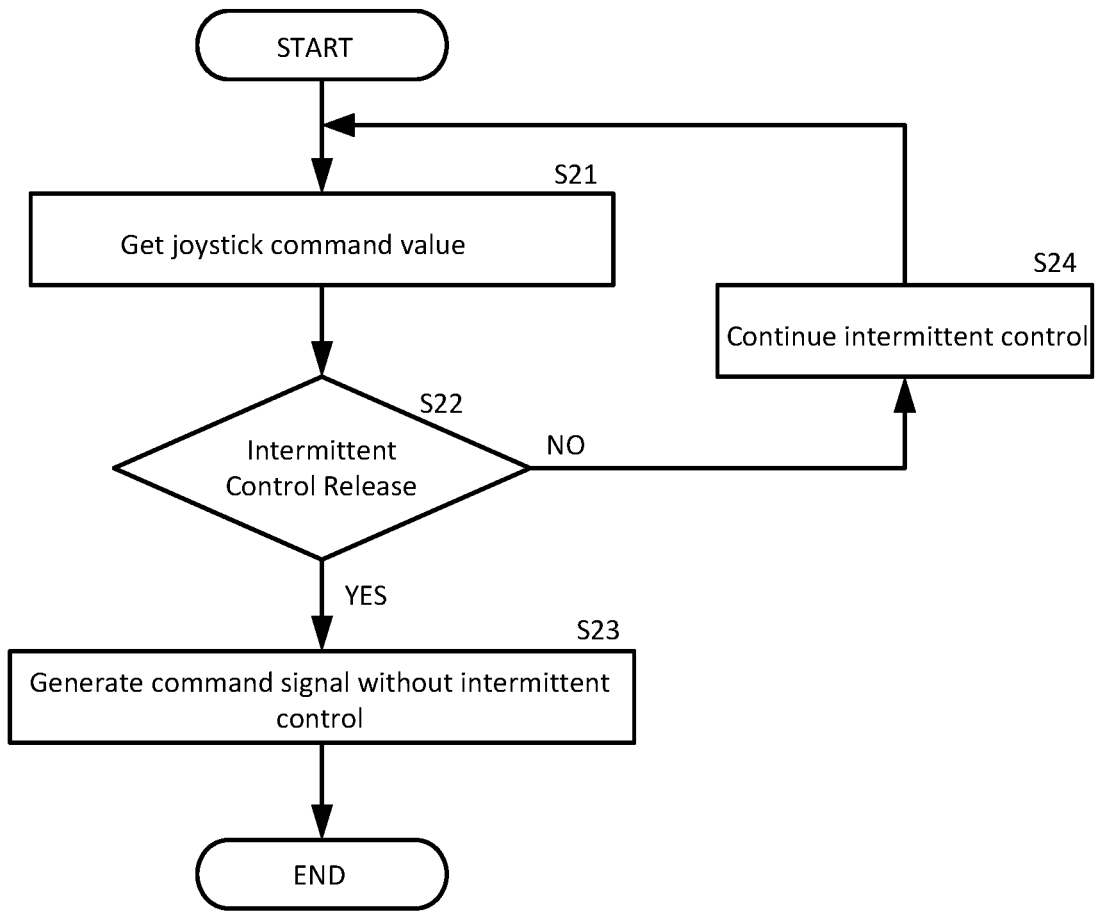
FIG. 9.

FIG. 9 is a flow chart showing an example of release (disable) processing of intermittent control mode.

A mode setting unit 21 acquires a maneuvering command value (Joystick command value (x), Joystick command value (y), Joystick command value (z)) (S 21).

When the mode setting unit 21 detects release (invalidation) of the intermittent control mode from the joystick command value (z) (S 22: YES), it instructs a throttle command signal generation unit 22 to invalidate the intermittent control.

Upon receiving the instruction to invalidate the intermittent control, a throttle command signal generation unit 22 generates a throttle command signal with a constant amplitude (level) corresponding to the throttle opening according to the joystick command value (x) (S 23).

Note that, from the joystick command value (z), the mode setting unit 21 does not invalidate the intermittent control until it detects the release (invalidation) of the intermittent control mode (S 22: NO), but repeats the acquisition of the joystick command value (z) and the determination of the release of the intermittent control.

As described above, by the configuration and control of the present embodiment, the ship control device 10 and the ship control system 1 can intermittently generate thrust during turning and prevent the turning radius from becoming undesirably large even if the actual rudder angle is delayed in following the command rudder angle. Thus, the ship control device 10 and the ship control system 1 can more reliably realize the turning intended by the operator. Also, the ship control device 10 and the ship control system 1 can release the intermittent control as needed.

At this time, by using the first operating device 30 consisting of a joystick, the operator can enable or disable the intermittent control with a simple operation.

Figure 10:
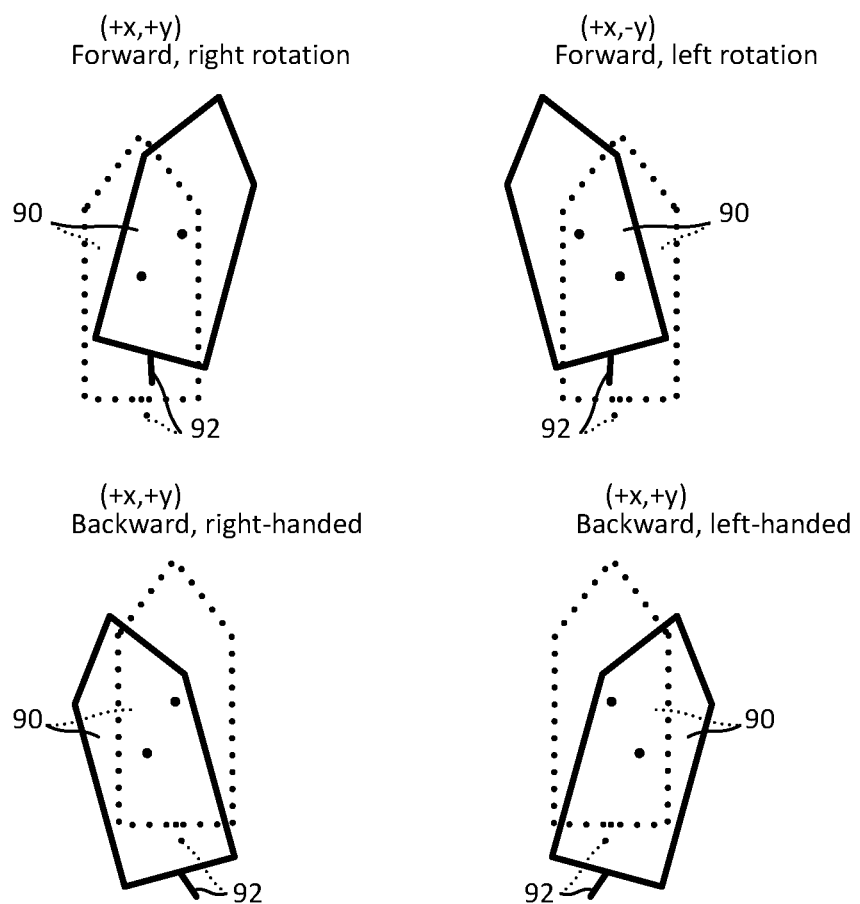
FIG. 10.

In the above explanation, the case of forward right rotation was used as an example, but as shown in FIG. 10, intermittent control can be similarly performed not only for forward right rotation but also for forward left rotation, backward right rotation and backward left rotation. FIG. 10 is a diagram showing various examples of traveling and turning directions. However, in the case of backward turning, it is recommended not to perform intermittent control but to perform boost control described later. That is, it is recommended to perform intermittent control without boost control for forward turning and to perform boost control without intermittent control for backward turning.

Then, regardless of which direction the forward turning is in, by performing intermittent control, turning can be performed with a smaller turning radius than when no intermittent control is performed. Therefore, the ship control device 10 and the ship control system 1 can more reliably achieve the turning intended by the operator.

Second Embodiment

Ship control technology (Ship control device, ship control method, and ship control program) according to the second embodiment of the present invention will be described with reference to the figures.

The ship control technology according to the second embodiment differs from the ship control technology according to the first embodiment in that boost control of throttle opening is performed. Other configurations and controls of the ship control technology of the second embodiment are the same as those of the ship control technology of the first embodiment, and descriptions of similar units are omitted.

Figure 11:
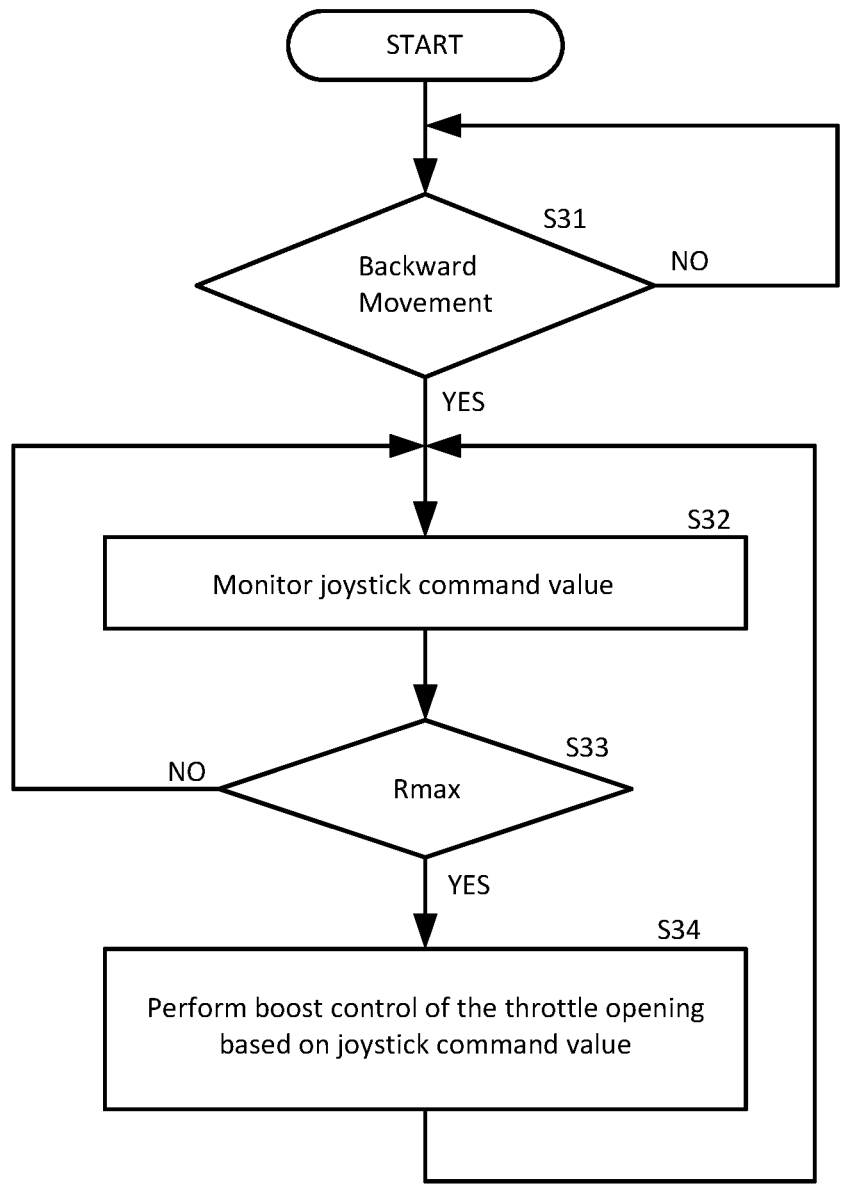
FIG. 11.
Figure 12:
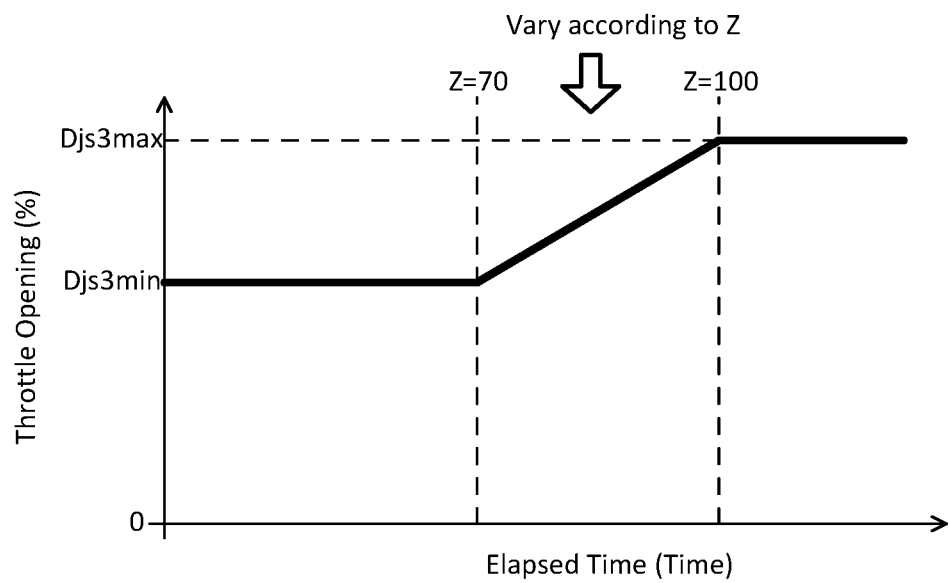
FIG. 12.

FIG. 11 is a flow chart showing an example of boost control in the ship control technology of the second embodiment. FIG. 12 is a diagram showing an example of throttle opening during boost control.

As shown in FIG. 11, during backward movement (S 31: YES), the mode setting unit 21 monitors the joystick command value (x) (S 32). The mode setting unit 21 detects whether the joystick command value (x) is −100, that is, the throttle opening is Rmax specified.

When the throttle opening is Rmax specified (S 33: YES), the mode setting unit 21 permits boosting by the joystick command value (z). When the throttle opening is not Rmax specified (S 33: NO), the mode setting unit 21 does not permit boosting by the joystick command value (z) (S 33: NO).

When a boost permission state (Joystick command value greater than the given value (For example, ABS (z)>70 as well as intermittent control of forward turning.)) exists, the mode setting unit 21 performs boost control of the throttle opening according to the joystick command value (z) (S 34).

Specifically, the mode setting unit 21 adjusts the throttle opening (Hi level of the throttle command signal) according to the joystick command value (z). For example, as shown in FIG. 12, when the joystick command value (z) is between 70 and 100, boost control of the throttle opening is performed so that the throttle opening monotonically increases as the joystick command value (z) increases.

By performing such control, the turning intended by the operator can be more reliably realized when the ship is moving backward. That is, due to the hull shape and other properties, the backward thrust and its action are generally less effective than forward. As a result, when the operator makes a backward turn with the same feeling as when making a forward turn, the turning amount may become unnecessarily large. Thus, there are many scenes in which the operator wants to increase thrust when making a backward turn. Therefore, when the same operation as the forward turn is performed in the backward turn, the backward thrust is increased to a certain upper limit. This makes it easier to achieve the desired thrust and turn even in the backward turn, and makes handling in a narrow range even easier. In this embodiment, boost control is performed only in the backward turn, but it is also applicable in the forward turn.

Third Embodiment

Ship control technology (Ship control device, ship control method, and ship control program) according to the third embodiment of the present invention will be described with reference to the figures.

Figure 13:
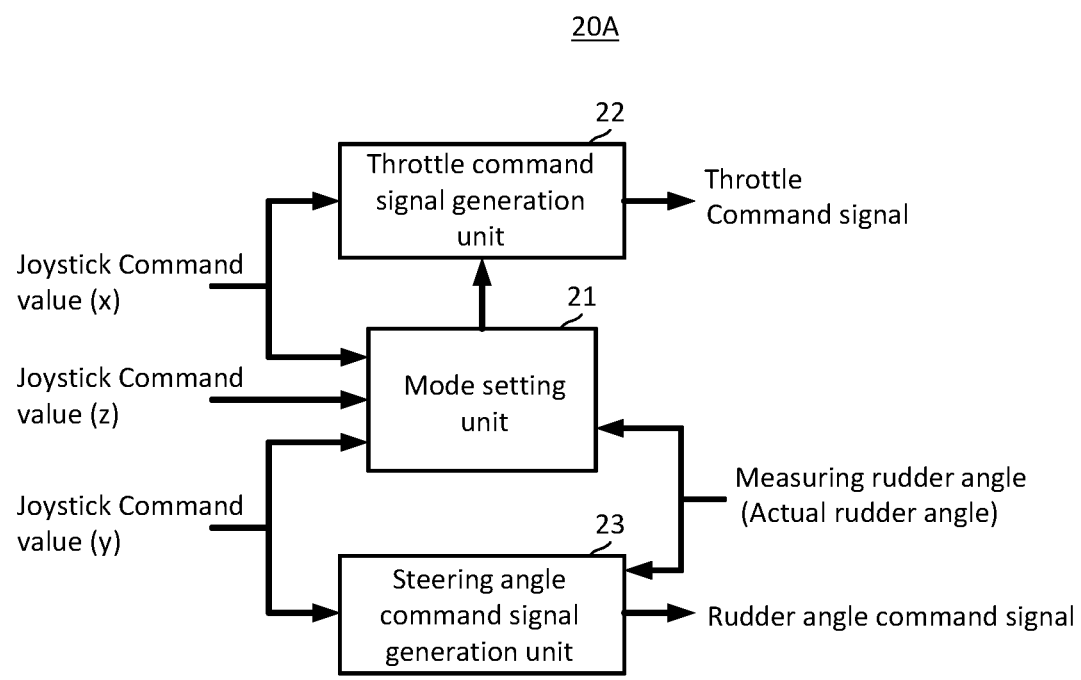
FIG. 13.

Whereas the ship control technology according to the first embodiment is control related to turning while moving forward or backward, the ship control technology according to the third embodiment of the present invention realizes control related to minimum turning control (turning head). FIG. 13 is a functional block diagram showing an example of the configuration of the control unit according to the third embodiment of the present invention.

As shown in FIG. 13, the control unit 20 A according to the third embodiment differs from the control unit 20 according to the first embodiment in that the measured rudder angle (actual rudder angle) is input to the mode setting unit 21. The other basic configuration of the control unit 20 A is the same as that of the control unit 20, and its explanation is omitted.

Figure 14:
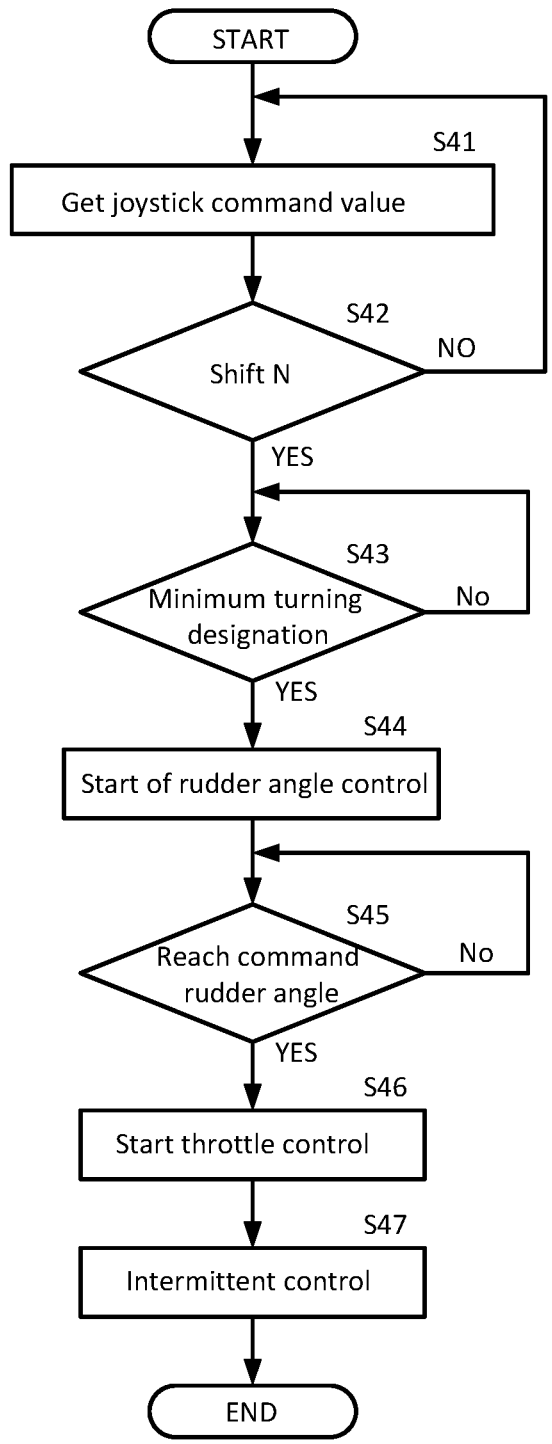
FIG. 14.
Figure 15A:
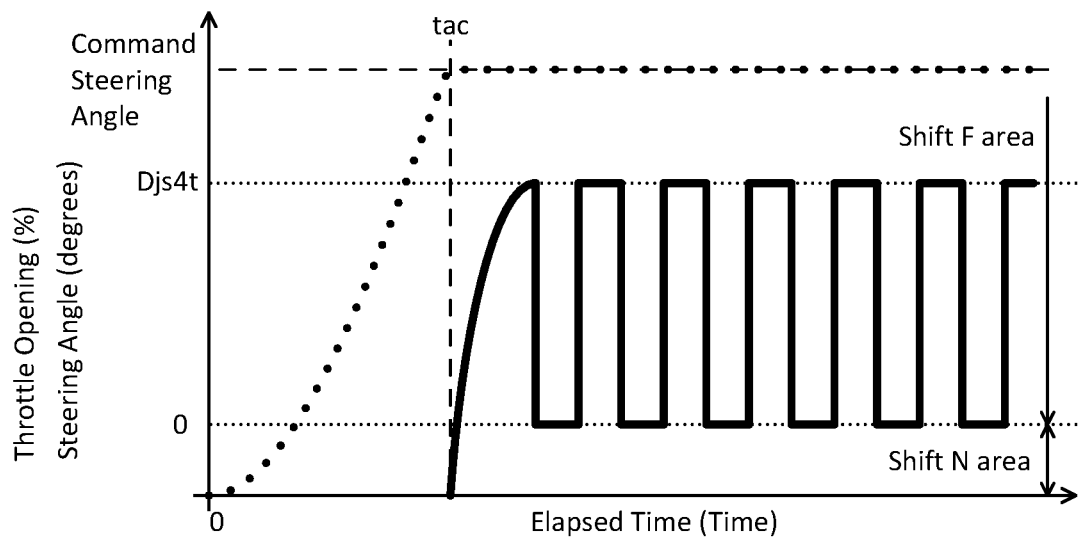
FIGS. 15A to 15B.
Figure 15B:
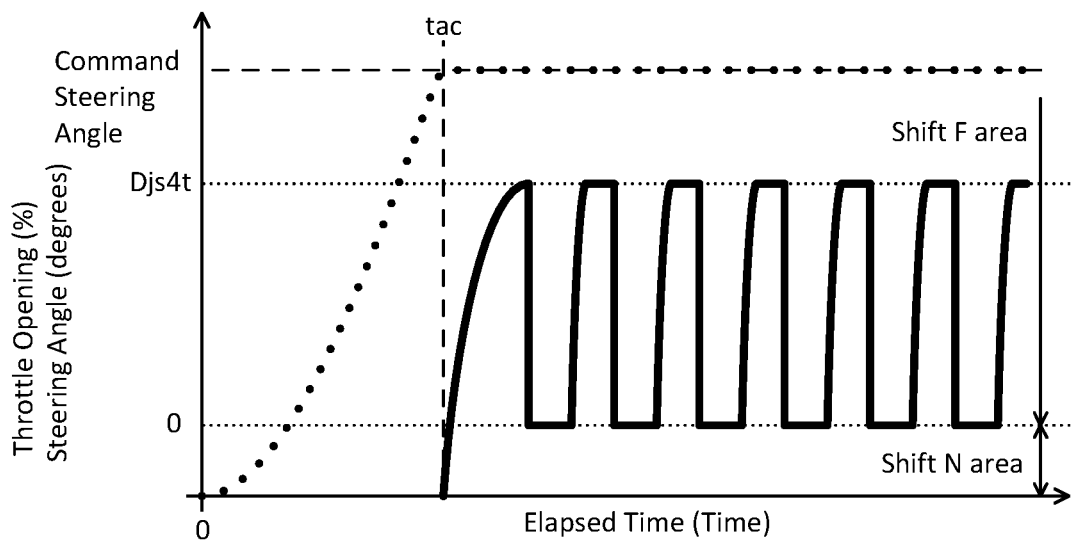

FIG. 14 is a flow chart showing an example of the control of the minimum turning control mode. FIG. 15A and FIG. 15B are diagrams showing an example of the waveforms of the command rudder angle and throttle opening in the minimum turning control mode.

When the mode setting unit 21 detects a stopped state from the ship speed or the like acquired by the sensor 60, it acquires the joystick command value (x) and the joystick command value (z) of the maneuvering command value (S 41).

The mode setting unit 21 detects the shift N from the joystick command value (x) (S 42: YES), and detects whether or not a minimum turning control mode is specified from the joystick command value (z). Specifically, for example, if the joystick command value (z) is greater than +70, the mode setting unit 21 determines that a clockwise minimum turning control mode is specified. If the joystick command value (z) is smaller than −70, the mode setting unit 21 determines that the minimum-turning control mode for counterclockwise rotation is specified. If the absolute value ABS (z) is 70 or less, the mode setting unit 21 determines that the minimum-turning control mode is not specified.

When the mode setting unit 21 determines that the minimum-turning control mode is specified (S 43: YES), it instructs the throttle command signal generation unit 22 to maintain or suppress the stop state of the throttle command signal.

At this time, the rudder angle command signal generation unit 23 sets the maximum rudder angle command rudder angle in the direction based on the z sign and starts rudder angle control (S 44).

When the actual rudder angle reaches the command rudder angle (S 45: YES), the mode setting unit 21 instructs the throttle command signal generation unit 22 to start outputting the throttle command signal and to generate the throttle command signal under intermittent control. The mode setting unit 21 determines that the actual rudder angle reaches the command rudder angle, for example, by the actual rudder angle input from the rudder reference unit 920.

The throttle command signal generation unit 22 generates and outputs an intermittently controlled throttle command signal according to the output start instruction (S 46) (S 47). At this time, the throttle command signal generation unit 22 sets the Hi level of the throttle command signal to a value Djs 4 t corresponding to the joystick command value (x) and the Low level of the throttle command signal to a value corresponding to the throttle opening 0% (i.e., 0).

At this time, the throttle command signal generation unit 22 blunts the rising waveform of the initial throttle command signal (rise of the throttle opening). In other words, the throttle command signal generation unit 22 gradually raises the level of the rising waveform of the initial throttle command signal (rise of the throttle opening) so that it becomes a rising waveform with a gentle slope compared to the falling waveform.

The waveforms by this control are shown in FIG. 15A and FIG. 15B.

In the case of FIG. 15A, first, the control of the rudder angle by the command rudder angle precedes, and the actual rudder angle reaches the command rudder angle. At this time tac, the output of the throttle command signal is permitted, and the intermittently controlled throttle command signal is output. In other words, until the actual rudder angle reaches the command rudder angle tac, the output of the throttle command signal is stopped or the amplitude (level) of the throttle command signal is suppressed to zero. In this case, the amplitude (level) is not limited to zero, but may be smaller than the value determined by the throttle command signal and less than a predetermined threshold.

The throttle command signal is then adjusted so that the level gradually increases (resulting in a dulled waveform) at the first rise.

By performing such control, even if the change in the rudder angle is slow, the throttle command signal is output after the rudder angle reaches the command rudder angle, so that unwanted forward (or backward) movement can be suppressed when turning in place is desired.

Also, by setting the low level of the throttle command signal to 0, unwanted forward (or backward) movement can be suppressed when turning in place, and minimal turning control can be realized with a smaller turning radius.

Furthermore, by gradually raising the level of the slot command signal at the beginning of the throttle command signal, unwanted forward (or backward) movement can be suppressed more reliably when turning in place.

The control unit 20 A preferably further performs the control shown in FIG. 15B. In the case of FIG. 15B, the waveform is blunted at the rising of the waveform in the intermittent control of the throttle command signal. In other words, at the rising of the intermittent control of the throttle command signal, the level is gradually raised so that the rising waveform has a gentle slope compared to the falling waveform. This control can also be applied at the turn shown in the first embodiment.

By performing such control, the throttle command signal level can be suppressed from rapidly changing from 0 to Hi level, so that the so-called shift shock can be suppressed, and a smoother and more stable minimum turning control can be realized.

The release of the minimum turning control can be realized by the joystick command value (z). For example, when the absolute value ABS (z) of the joystick command value (z) is detected to be 30 or less, the minimum turning control is released.

Fourth Embodiment

Ship control technology (Ship control device, ship control method, and ship control program) according to the fourth embodiment of the present invention will be described with reference to the figures.

The ship control technology according to the fourth embodiment differs from the ship control technology according to the third embodiment in that the throttle opening during minimum turning control can be adjusted. Other configurations and controls of the ship control technology according to the fourth embodiment are the same as those of the ship control technology according to the third embodiment, and descriptions of similar units are omitted.

Figure 16:
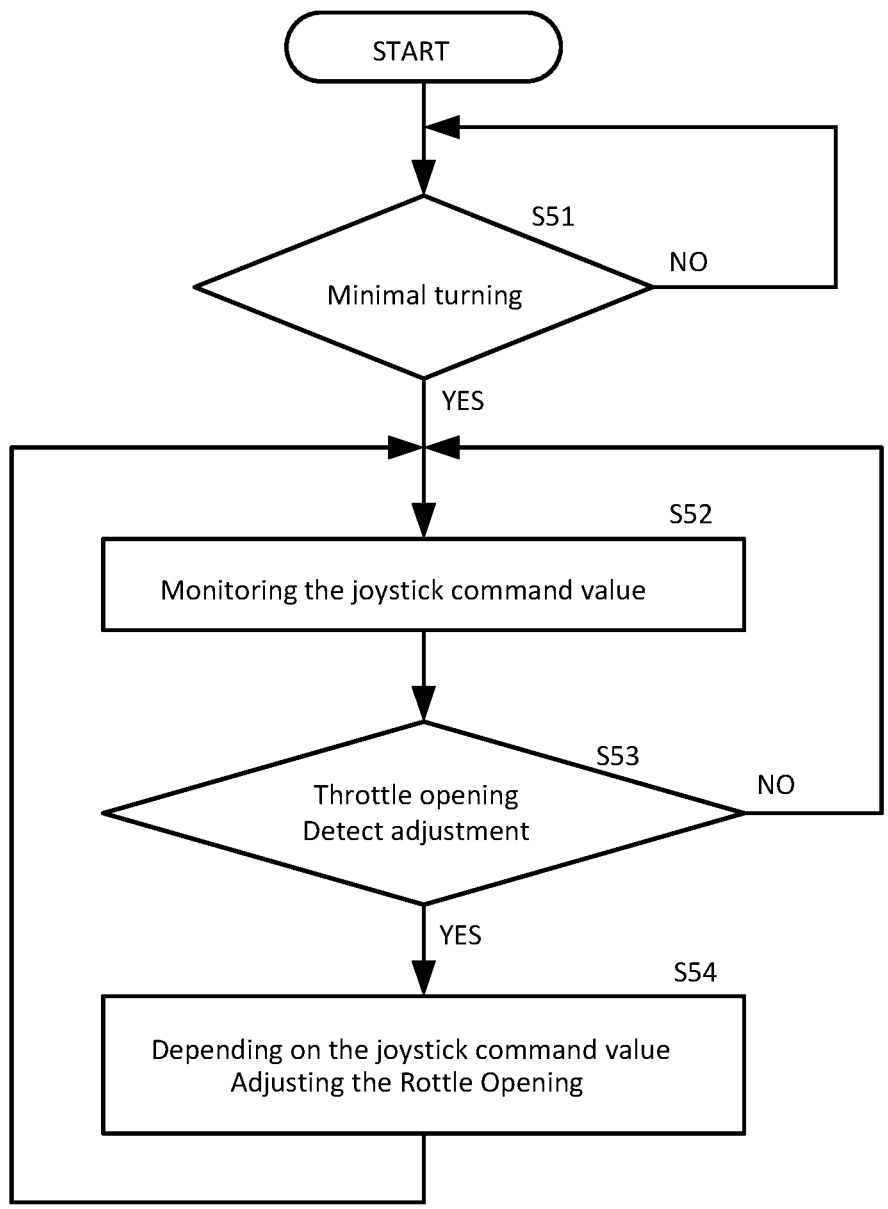
FIG. 16.
Figure 17A:
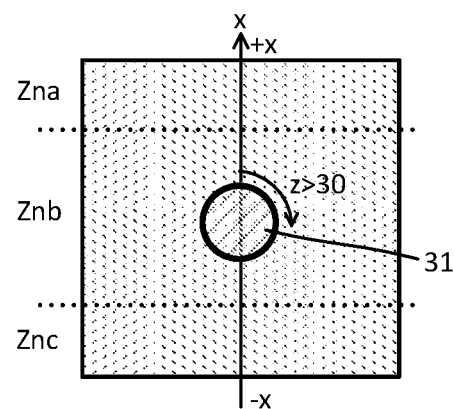
FIGS. 17A to 17B.
Figure 17B:
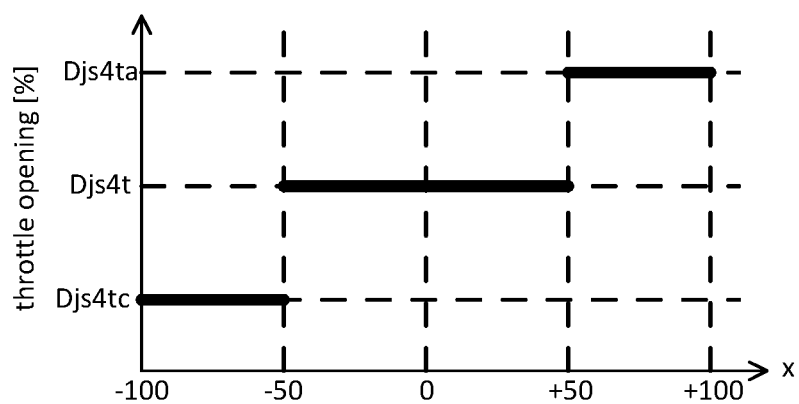

FIG. 16 is a flow chart showing an example of the adjustment control of the throttle opening during the minimum turning control according to the fourth embodiment. FIG. 17A is a diagram showing the state of the head during the adjustment control of the throttle opening, and FIG. 17B is a diagram showing an example of the setting of the throttle opening during the adjustment control of the throttle opening.

The mode setting unit 21 monitors the joystick command value (z) and the joystick command value (x) during the minimum turning control (S 51: YES) (S 52). When the mode setting unit 21 detects the adjustment of the throttle opening from the joystick command value (z) and the joystick command value (x) (S 53: YES), it adjusts the throttle opening (Hi level of the throttle command signal) according to the joystick command value (x) (S 54).

More specifically, for example, during minimum turning control, the mode setting unit 21 monitors the joystick command value (x) when the absolute value ABS (z) of the joystick command value (z) is 30 or more (during minimum turning control) as shown in FIG. 17A. The mode setting unit 21 divides the range of the joystick command value (x) into the range Znb including x=0 (For example, in FIG. 17B, −50<x<+50), the range Zna of x larger than the range Znb (For example, x>+50 in FIG. 17B), and the range Znc of x smaller than the range Znb (For example, in FIG. 17B, x<−50). If the joystick command value (x) is within the range Znb, the mode setting unit 21 sets the default throttle opening Djs 4 *t*. If the joystick command value (x) is within the range Zna, the mode setting unit 21 sets the throttle opening Djs 4 a (>Djs 4 *t*). If the joystick command value (x) is within the range Znc, the mode setting unit 21 sets the throttle opening Djs 4 *c*(<Djs 4 *t*).

By performing such control, the throttle opening during the minimum turning control can be adjusted in multiple steps. This allows the operator to adjust the thrust according to the turning conditions. Therefore, the desired turning can be realized more reliably for the operator.

Fifth Embodiment

Figure 18:
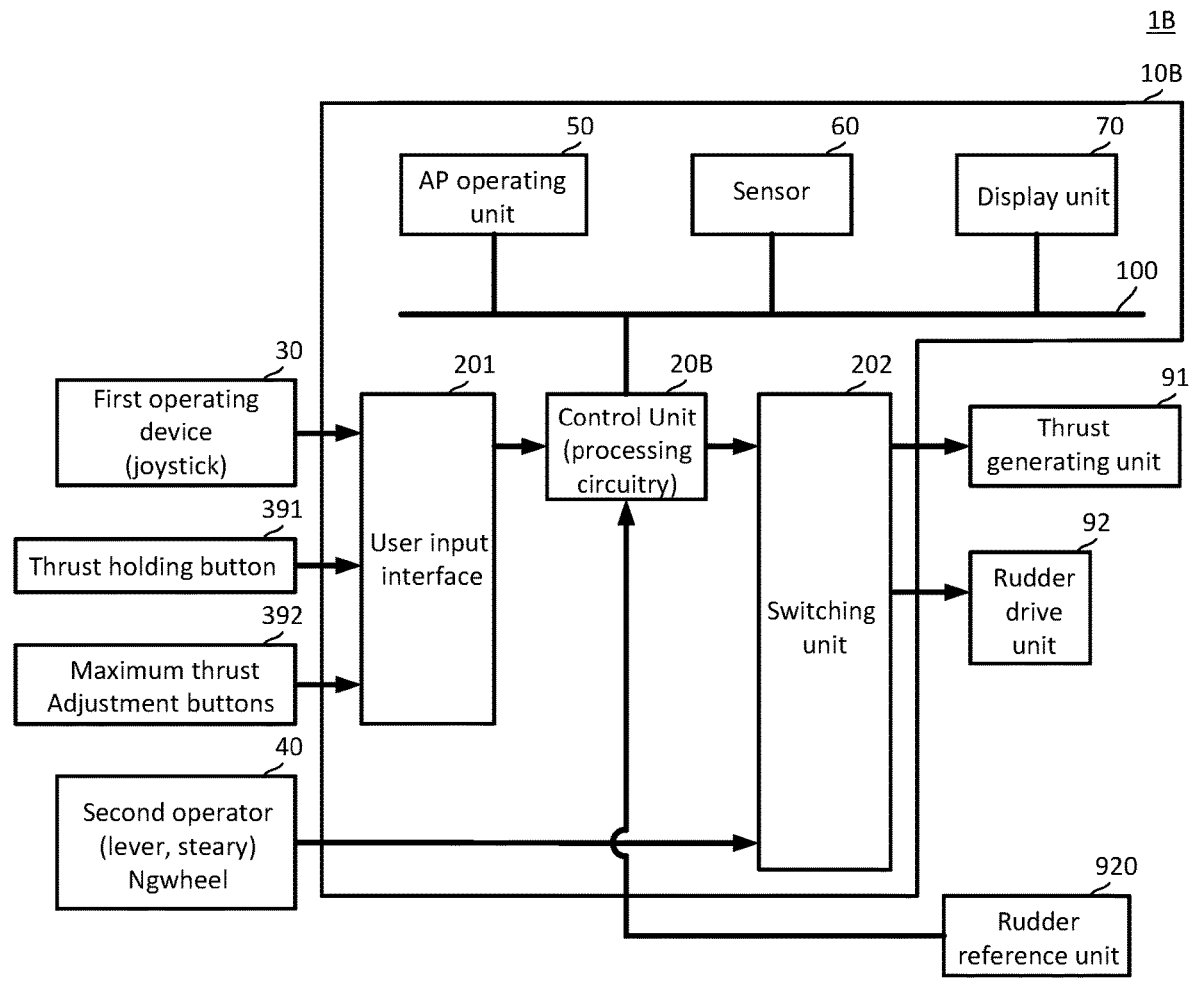
FIG. 18.

Ship control technology (Ship control device, ship control method, and ship control program) according to the fifth embodiment of the present invention will be described with reference to the figures. FIG. 18 is a functional block diagram showing an example of the configuration of a ship control system including a ship control device according to the fifth embodiment of the present invention.

As shown in FIG. 18, the ship control system 1B and the ship control device 10 B according to the fifth embodiment differ from the ship control system 1 and the ship control device 10 according to the first embodiment in the control of the control unit 20 B by providing a thrust holding button 391 and a maximum thrust adjusting button 392. Other configurations and controls of the ship control system 1B and the ship control device 10 B are the same as those of the ship control system 1 and the ship control device 10, and descriptions of similar units are omitted.

The thrust holding button 391 and the maximum thrust adjusting button 392 are arranged, for example, in the vicinity of the first operating device 30. In other words, the thrust holding button 391 and the maximum thrust adjusting button 392 are arranged in positions where the operator can operate the first operating device 30 while operating it.

When the thrust holding button 391 detects the operation input of the thrust holding, it outputs the detection result to the control unit 20 B.

The maximum thrust adjusting button 392 is provided with, for example, a button for increasing the maximum thrust and a button for decreasing the maximum thrust. When the maximum thrust adjusting button 392 detects the operation input of the adjustment of the maximum thrust, it outputs the detection result to the control unit 20 B.

(Holding the Thrust)

Figure 19:
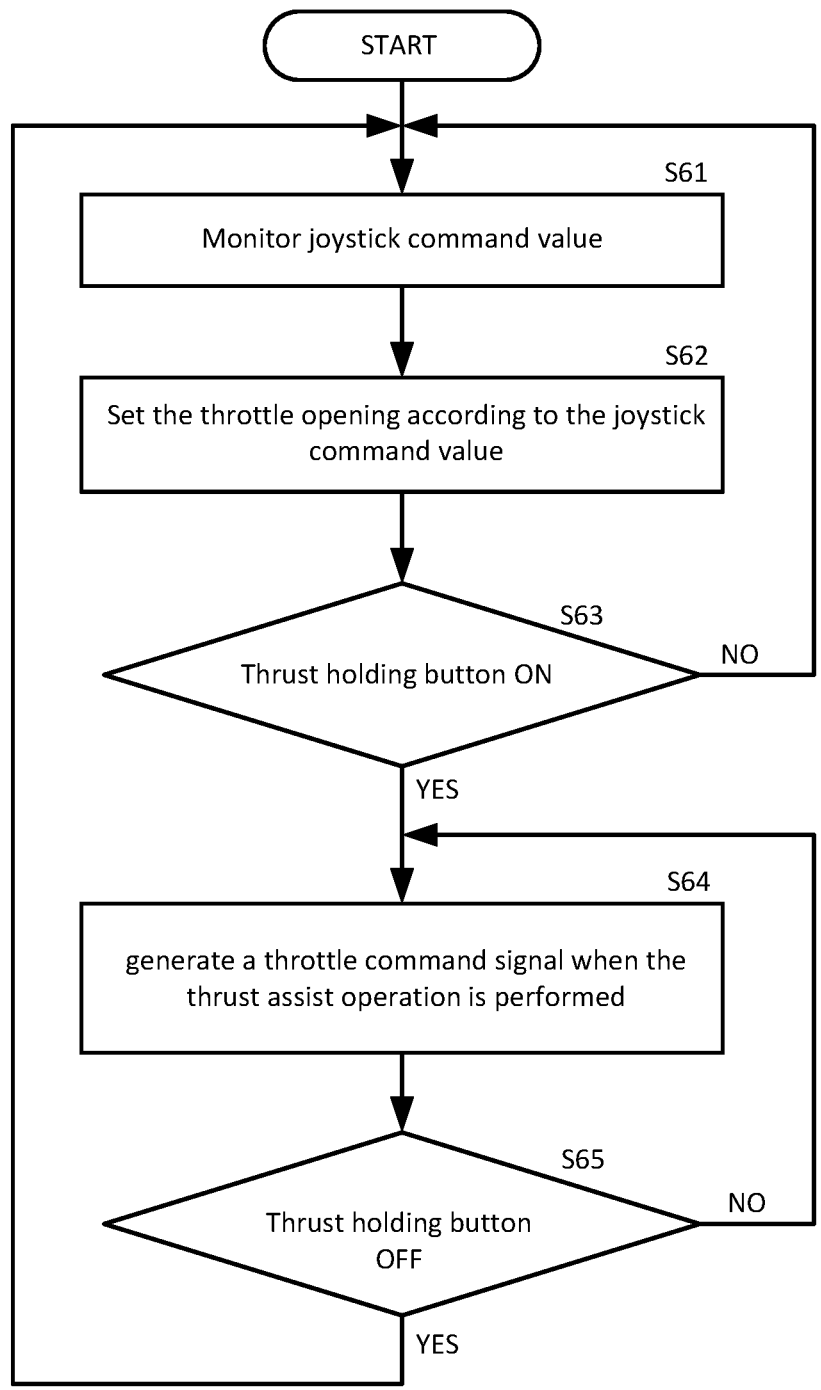
FIG. 19.

FIG. 19 is a flow chart showing an example of the thrust holding control.

A throttle command signal generating unit 22 of the control unit 20 B monitors the joystick command value (x) (S 61). A throttle command signal generating unit 22 sets the throttle opening according to the joystick command value (x) and generates a throttle command signal of the amplitude corresponding to this (S 62).

When the thrust holding button 391 is turned ON (S 63: YES), the operation result is given to the throttle command signal generating unit 22 of the control unit 20 B.

The throttle command signal generating unit 22 generates a throttle command signal so as to hold the throttle opening when the thrust assist operation is performed (ON operation) (S 64).

The throttle command signal generating unit 22 continues to hold the throttle opening until the thrust holding button 391 is turned OFF (S 65: NO).

When the thrust holding button 391 is turned OFF (S 65: YES), the throttle command signal generating unit 22 releases the holding of the throttle opening, sets the throttle opening according to the joystick command value (x), and generates a throttle command signal with the corresponding amplitude.

With such a configuration and control, the operator can easily hold the prescribed throttle opening (thrust). That is, for an operator such as a joystick, it is easy to change the throttle opening. However, it is difficult to keep the throttle opening constant because the control head 31 has to be fixed without moving the position.

Therefore, by operating the thrust holding button 391, the throttle opening (thrust) does not change even if the control head 31 moves, so the operator can easily keep the throttle opening constant.

Furthermore, at this time, the rudder angle command signal generation unit 23 can set the command rudder angle according to the joystick command value (y). Thus, the operator only has to focus on turning and operate the first operating device 30. Therefore, the operator can easily achieve the desired turn with constant thrust.

The release of the thrust holding is not limited to the OFF operation of the thrust holding button 391, but can be handled, for example, by operating in the backward direction during the forward operation (by making the joystick command value (x) smaller than 0).

In addition, the thrust holding is generally used during the forward operation, but it can also be applied during the backward operation.

(Adjustment of Maximum Thrust)

Figure 20:
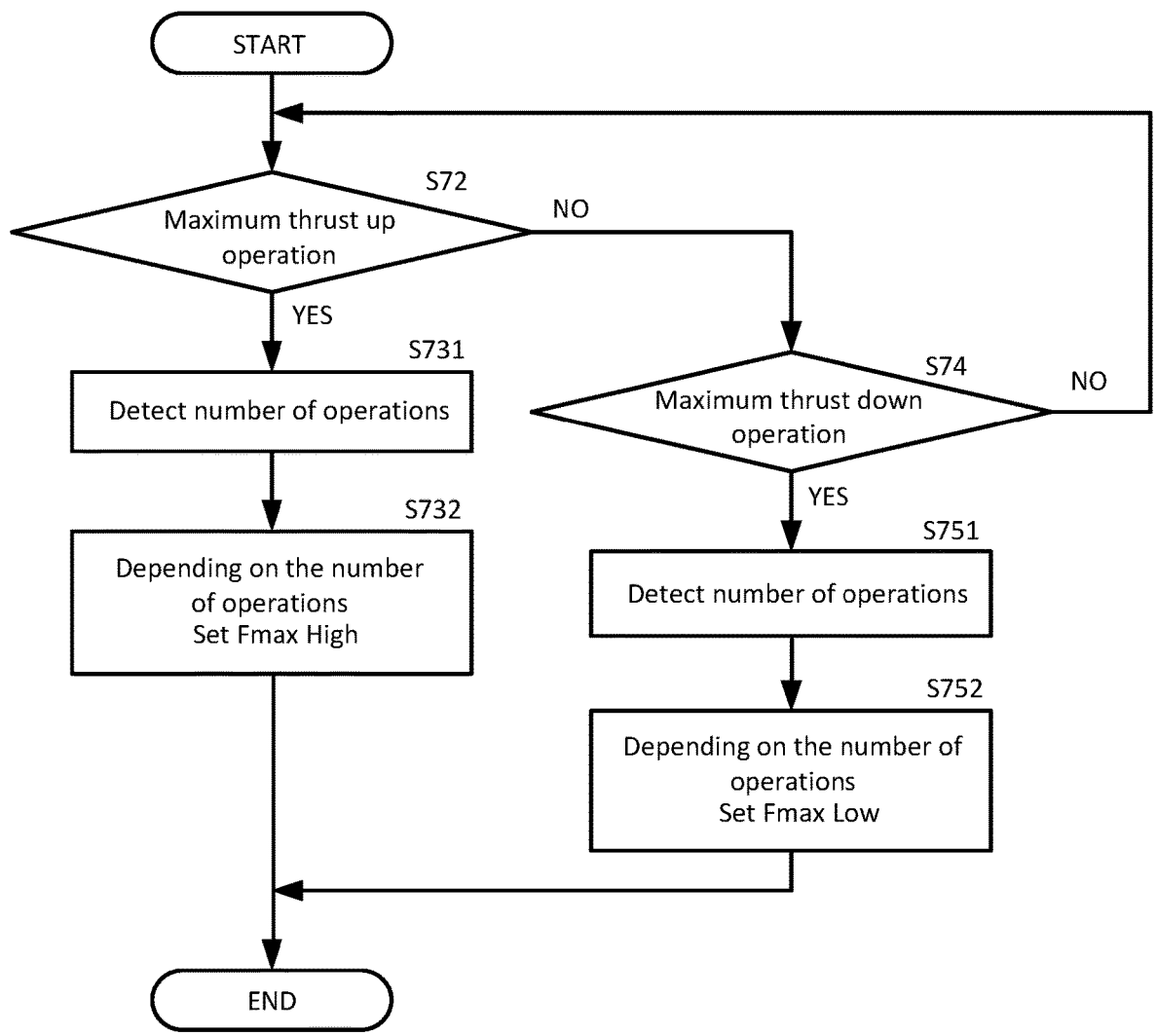
FIG. 20.

FIG. 20 is a flow chart showing an example of adjustment control of maximum thrust.

When a throttle command signal generation unit 22 detects an operation to increase maximum thrust (maximum thrust up operation) (S 72: YES), it detects the number of operations (S 731), and sets the aforementioned throttle opening Fmax high according to the number of operations (S 732). In other words, the throttle command signal generation unit 22 sets the corresponding throttle opening Fmax high when the joystick command value (x) is 100 according to the number of operations to increase the maximum thrust.

When the throttle command signal generation unit 22 detects an operation to decrease the maximum thrust (maximum thrust down operation) (S 72: NO, S 74: YES), it detects the number of operations (S 751) and sets the throttle opening Fmax high according to the number of operations (S 752). In other words, the throttle command signal generation unit 22 sets the corresponding throttle opening Fmax low according to the number of operations to decrease the maximum thrust when the joystick command value (x) is 100.

By performing such control, the operator can adjust the maximum thrust while performing forward control.

The default value of the maximum thrust is, for example, the intermediate value between the maximum and minimum values that can be adjusted as the maximum thrust. However, the default value of the maximum thrust can be set as appropriate at the time of shipment from the factory (when it is first provided to the user).

In the present embodiment, the maximum thrust at the time of forward movement is adjusted, but the maximum thrust at the time of backward movement can be similarly adjusted. Moreover, the adjustment result of the maximum thrust at the time of forward movement can be reflected in the maximum thrust at the time of backward movement. That is, the maximum thrust at the time of forward movement and the maximum thrust at the time of backward movement can be adjusted as a set value.

In addition, although the present embodiment shows a case in which both the thrust holding and the adjustment of the maximum thrust are provided, at least one of the thrust holding and the adjustment of the maximum thrust may be provided.

In addition, the criteria for various judgments and the like represented by the numerical values shown in each of the above embodiment are an example, and can be set appropriately according to the preference of the operator and the like.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A ship control device to be installed on a ship, comprising:
   a user input interface configured to input a maneuvering command value corresponding to a command for throttle control and a command for intermittent control with respect to an operation control of the ship; and
   processing circuitry configured to:
   generate a throttle command signal for the ship based on the maneuvering command value, wherein the processing circuitry further configured to:
   set an activation of the intermittent control if the value corresponding to the command of the intermittent control is within a prescribed intermittent control range;
   generate the throttle command signal of an intermittent control waveform having a Hi level and a Low level that is lower than the Hi level, when the intermittent control is activated;
   set the activation of the intermittent control when the value corresponding to the throttle control is within a prescribed minimum turning control range and when the value corresponding to the command of the intermittent control is within the prescribed intermittent control range;
   set a rudder angle command signal which commands a rudder angle of the ship to a largest command rudder angle within a settable range when the intermittent control is activated; and
   generate the throttle command signal of the intermittent control waveform having a prescribed Hi level for the minimum turning control and a prescribed Low level, that is lower than the prescribed Hi level, for the minimum turning control when the intermittent control is activated.

2. The ship control device of claim 1, wherein the processing circuitry is further configured to:
   set the throttle command signal to zero or a predetermined threshold value that is less than the value of the throttle command signal during a period until the actual rudder angle reaches the maximum rudder angle.

3. The ship control device of claim 2, wherein the processing circuitry is further configured to:
   generate the throttle command signal of the intermittent control waveform having a rising waveform with a gradual slope at a first rising waveform compared to a falling waveform when the actual rudder angle reaches the maximum rudder angle.

4. The ship control device of claim 1, wherein the processing circuitry is further configured to:
   generate the throttle command signal of the intermittent control waveform having a rising waveform with a gradual slope compared to a falling waveform.

5. The ship control device of claim 1, wherein the processing circuitry is further configured to:
   set the Hi level by a throttle opening based on the maneuvering command value corresponding to the throttle control, and set the Low level by a dead-slow opening.

6. The ship control device of claim 1, wherein the processing circuitry is further configured to:
   set the Hi level for the minimum turning control by a prescribed throttle opening for the minimum turning control, and
   set the Low level for the minimum turning control to a fully closed throttle state.

7. The ship control device as claimed in claim 6, wherein the processing circuitry is further configured to:
   adjust the throttle opening for the minimum turning control based on the value corresponding to the throttle control during the minimum turning control.

8. The ship control device of claim 1, wherein:
   the user input interface is further configured to input a thrust holding signal which commands retention of the thrust of the ship based on a user operation, and
   the processing circuitry is further configured to
   fix a level of the throttle command signal to hold the throttle opening according to the maneuvering command value at the time of the input of the thrust holding signal.

9. The ship control device of claim 1, wherein the processing circuitry is further configured to:
   set the maximum throttle opening corresponding to the Hi level of the throttle command signal according to an adjustment instruction upon receiving the adjustment instruction to adjust the maximum throttle opening.

10. The ship control device of claim 1, wherein the processing circuitry is further configured to:
refrain from performing the intermittent control if the traveling direction of the ship is backward, and set throttle command signal to a prescribed value larger than a currently set thrust value if the value corresponding to the intermittent control command is within the prescribed intermittent control range to increase a backward thrust.

11. The ship control device of claim 1, further comprising:
an operating device configured to generate the maneuvering command value, wherein the operating device comprising:
a shaft with one end fixed and another end movable; and
a head positioned at the other end of the shaft and rotatable about an axis of the shaft; and
a sensor configured to generate the maneuvering command value according to a position of the head and an amount of rotation of the head.

12. The ship control device of claim 11, wherein:
the operating device is a joystick,
the sensor is further configured to generate the maneuvering command value based on a position in the x-axis direction parallel to a fore and aft direction of the ship, a position in the y-axis direction parallel to a starboard and port direction of the ship, and a position in the z-axis direction corresponding to the amount of rotation, and
the processing circuitry is further configured to:
determine the level of the throttle command signal based on the x-axis position in the maneuvering command value, and
determine the command rudder angle based on the y-axis position in the maneuvering command value, and
perform the intermittent control based on the z-axis position in the maneuvering command value.

13. The ship control device of claim 3, wherein the processing circuitry is further configured to:
generate the throttle command signal of the intermittent control waveform having a rising waveform with a gradual slope compared to a falling waveform.

14. The ship control device as claimed in claim 13, wherein the processing circuitry is further configured to:
adjust the throttle opening for the minimum turning control based on the maneuvering command value corresponding to the throttle control during the minimum turning control.

15. The ship control device of claim 14, wherein:
the user input interface is further configured to input a thrust holding signal which commands retention of the thrust of the ship based on a user operation, and
the processing circuitry is further configured to:
fix a level of the throttle command signal to hold the throttle opening according to the maneuvering command value at the time of the input of the thrust holding signal.

16. The ship control device of claim 15, wherein the processing circuitry is further configured to:
set the maximum throttle opening corresponding to the Hi level of the throttle command signal according to an adjustment instruction upon receiving the adjustment instruction to adjust the maximum throttle opening.

17. The ship control device of claim 16, wherein the processing circuitry is further configured to:
refrain from performing the intermittent control if the traveling direction of the ship is backward, and set throttle command signal to a prescribed value larger than a currently set thrust value if the value corresponding to the intermittent control command is within the prescribed intermittent control range to increase a backward thrust.

18. A ship control method for operation control of a ship, the method comprising:
inputting a maneuvering command value corresponding to a command for throttle control and a command for intermittent control with respect to an operation control of the ship;
generating a throttle command signal for the ship based on the maneuvering command value;
setting an activation of the intermittent control if the value corresponding to the command of the intermittent control is within a prescribed intermittent control range;
generating a throttle command signal of an intermittent control waveform having a Hi level and a Low level that is lower than the Hi level, when the intermittent control is activated;
setting the activation of the intermittent control when the value corresponding to the throttle control is within a prescribed minimum turning control range and when the value corresponding to the command of the intermittent control is within the prescribed intermittent control range;
setting a rudder angle command signal which commands a rudder angle of the ship to a largest command rudder angle within a settable range when the intermittent control is activated; and
generating the throttle command signal of the intermittent control waveform having a prescribed Hi level for the minimum turning control and a prescribed Low level, that is lower than the prescribed Hi level, for the minimum turning control when the intermittent control is activated.

19. A non-transitory computer-readable medium having stored thereon computer-executable instructions which, when executed by a computer, cause the computer to:
input a maneuvering command value corresponding to a command for throttle control and a command for intermittent control with respect to an operation control of a ship
generate a throttle command signal for the ship based on the maneuvering command value;
set an activation of the intermittent control if the value corresponding to the command of the intermittent control is within a prescribed intermittent control range;
generate a throttle command signal of an intermittent control waveform having a Hi level and a Low level that is lower than the Hi level, when the intermittent control is activated;
set the activation of the intermittent control when the value corresponding to the throttle control is within a prescribed minimum turning control range and when the value corresponding to the command of the intermittent control is within the prescribed intermittent control range;
set a rudder angle command signal which commands a rudder angle of the ship to a largest command rudder angle within a settable range when the intermittent control is activated; and
generate the throttle command signal of the intermittent control waveform having a prescribed Hi level for the minimum turning control and a prescribed Low level, that is lower than the prescribed Hi level, for the minimum turning control when the intermittent control is activated.

\* \* \* \* \*